US009949174B2

(12) United States Patent
Olsson et al.

(10) Patent No.: US 9,949,174 B2
(45) Date of Patent: Apr. 17, 2018

(54) METHOD AND NODES FOR HANDLING A UES ACCESS TO NETWORKS

(71) Applicant: Telefonaktiebolaget LM Ericsson (publ), Stockholm (SE)

(72) Inventors: Lars-Bertil Olsson, Angered (SE); Jesus-Angel De-Gregorio-Rodriguez, Madrid (ES); Shabnam Sultana, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/034,313

(22) PCT Filed: Mar. 23, 2016

(86) PCT No.: PCT/EP2016/056354
§ 371 (c)(1),
(2) Date: May 4, 2016

(87) PCT Pub. No.: WO2016/156143
PCT Pub. Date: Oct. 6, 2016

(65) Prior Publication Data
US 2017/0105150 A1    Apr. 13, 2017

Related U.S. Application Data

(60) Provisional application No. 62/139,244, filed on Mar. 27, 2015.

(51) Int. Cl.
*H04W 36/00* (2009.01)
*H04W 48/18* (2009.01)
(Continued)

(52) U.S. Cl.
CPC ......... *H04W 36/0055* (2013.01); *H04W 8/20* (2013.01); *H04W 36/14* (2013.01);
(Continued)

(58) Field of Classification Search
CPC ..... H04W 36/08; H04W 36/26; H04W 36/38; H04W 36/0055; H04W 48/18; H04W 84/042; H04W 36/14; H04W 8/20
See application file for complete search history.

(56) References Cited

U.S. PATENT DOCUMENTS

2007/0287419 A1* 12/2007 Wang .................. H04W 60/00
455/411
2011/0021195 A1* 1/2011 Cormier ............... H04W 48/18
455/435.2
(Continued)

FOREIGN PATENT DOCUMENTS

WO    2014/047852 A1    4/2014

OTHER PUBLICATIONS

China Mobile, "Roaming Subscripton Corresponding to Specific RAT", 3GPP Draft; 29272_CR0574R2_(REL-13)_C4-142476, 3rd Generation Partnership Project (3GPP), Mobile Competence Centre, 650, Route Des Lucioles, F-06921 Sophia-Antipolis Cedex, France, vol. CT WG4, No. San Francisco, Nov. 16, 2014-Nov. 20, 2014 Dec. 7, 2014, 4 pages, XP050897488.
(Continued)

*Primary Examiner* — Daniel Lai
(74) *Attorney, Agent, or Firm* — Rothwell, Figg, Ernst & Manbeck, p.c.

(57) ABSTRACT

Methods, devices, computer programs and carriers comprising computer programs for handling handling a User Equipments, UE, access to networks are provided. A method performed by a mobility node 105 comprises, when the UE 101 accesses the current visited network 100v, transmitting 302, 401, through the visited network to a subscriber server 108 in a home network 100h of the UE 101, a request for access information for the UE 101. The request comprises network information which indicates the current visited network 100v and at least one potential visited network
(Continued)

which the UE 101 can access. The method further comprises receiving 304, 403, from the subscriber server 108, the requested access information for at least some of the networks indicated in the request. The access information comprises allowed network IDs and corresponding allowed RATs for at least some of the networks indicated in the request which the UE 101 is allowed to access. When the UE 101 should access one of the potential visited networks, the mobility node determines 405, based on the previously received access information, if the UE 101 is allowed to access the potential visited network.

53 Claims, 11 Drawing Sheets

(51) Int. Cl.
    *H04W 8/20*       (2009.01)
    *H04W 84/04*     (2009.01)
    *H04W 36/14*     (2009.01)
    *H04W 88/06*     (2009.01)

(52) U.S. Cl.
    CPC ......... *H04W 48/18* (2013.01); *H04W 84/042* (2013.01); *H04W 88/06* (2013.01)

(56) References Cited

U.S. PATENT DOCUMENTS

| | | | | |
|---|---|---|---|---|
| 2011/0117916 A1* | 5/2011 | Dahlen | ............... | H04W 48/02 455/436 |
| 2015/0208293 A1* | 7/2015 | Zhang | ............... | H04W 48/18 455/433 |
| 2016/0021146 A1* | 1/2016 | Mufti | ............... | H04L 65/1016 370/328 |

OTHER PUBLICATIONS

"3rd Generation Partnership Project, Technical Specification Group Services and System Aspects, Architectural requirements (Release 13)", 3GPP Standard, 3GPP TS 23.221, 3rd Generation Partnership Project (3GPP), Mobile Competence Centre, 650, Route Des Lucioles, F-06921 Sophia-Antipolis Cedex, France, vol. SA WG2, No. V13.0.0, Jun. 20, 2014, pp. 1-52, XP050774097.

Ericcson, "Discussion Paper on Access Restrictions per PLMN", 3GPP Draft, CA-1560528-Disc-Access-Restriction, 3rd Generation Partnership Project (3GPP), Mobile Competence Centre, 650, Route Des Lucioles, F-06921 Sophia-Antipolis Cedex, France, vol. CT WG4,, No. Bratislava, Slovakia, Apr. 13, 2015-Apr. 17, 2015 Apr. 3, 2015, 2 pages, XP050948105.

International Search Report and Written Opinion dated Jun. 3, 2016 in International application No. PCT/EP2016/056354, 16 pages.

* cited by examiner

METHOD AND NODES FOR HANDLING A UES ACCESS TO NETWORKS

CROSS-REFERENCE TO RELATED APPLICATIONS

This application is a 35 U.S.C. § 371 National Phase Entry Application from PCT/EP2016/056354, filed Mar. 23, 2016, and designating the United States, which claims priority to U.S. Provisional Application No. 62/139,244, filed Mar. 27, 2015. The contents of both applications are incorporated by reference.

TECHNICAL FIELD

Embodiments herein relate generally to a mobility node, a method in the mobility node, a subscriber server, a method in the subscriber server, a Radio Access Network (RAN) node and a method in the RAN node. More particularly the embodiments herein relate to handling a User Equipments (UE) access to networks.

BACKGROUND

A relationship exists between each subscriber and its Home-Public Land Mobile Network (H-PLMN). If communications for a subscriber are handled over another PLMN, this PLMN is referred to as the Visited-PLMN (V-PLMN). A PLMN has a geographical area allocated to it. This geographical area may be referred to as a PLMN area. For example, a PLMN may be limited by the borders of a country. There may be more than one PLMN per country. Using other words, the PLMN area is the geographical area in which a PLMN provides communication services according to the specifications to users of UEs. A group of PLMN areas accessible by UEs may be described as a system area. PLMNs shall provide a location registration function with the main purpose of providing continuity of service to UEs over the whole system area.

A UE may roam (nationally or internationally) and access services in the area authorized by the entitlement of its subscription. Roaming may be described as a service whereby a UE of a given PLMN (e.g. the H-PLMN) is able to obtain service from another PLMN (e.g. the V-PLMN). The other PLMN may be in a different or the same country as the given PLMN.

A location update procedure allows a UE to inform the cellular network, whenever it moves from one location area to the next, e.g. from a H-PLMN to a V-PLMN, from one V-PLMN to another V-PLMN. The location update procedure may be a Location Area Update (LAU) procedure, a Tracking Area Update (TAU) procedure or a Routing Area Update (RAU) procedure. LAU is used in Second Generation (2G) (e.g. Global System for Mobile communications (GSM)), TAU is used in Third Generation (3G) (e.g. Universal Terrestrial Radio Access Network (UTRAN)) and RAU is used in 3G (e.g. Evolved-UTRAN (E-UTRAN)).

As part of a UE registration at a Serving GPRS Support Node/Mobility Management Entity (SGSN/MME), the SGSN/MME sends an Update Location Request message to the Home Subscriber Server (HSS). In the response message from the HSS to the SGSN/MME, e.g. an Update Location Answer message, the HSS may include information about Radio Access Technologies (RAT) restrictions that applies to the UE, i.e. by which additional RATs the UE is granted access. The additional RATs are in addition to the access in which the UE is currently about to be served. The SGSN/MME may use this information to prevent attempts to perform access change to a RAT which is not allowed for the UE A limitation is that the information about RAT restrictions is signaled common to all Public Land Mobile Network IDentities (PLMN IDs)/operators. The resulting effect is that it is not possible for the HSS to apply differentiated access restrictions per operator, and the receiving SGSN/MME will apply the same restriction regardless of the PLMN ID of the potential target access.

Consider a roaming scenario where a UE from a H-PLMN PLMN-X becomes served in E-UTRAN by the operator of PLMN-1. The HSS provides an access restriction to E-UTRAN only to match roaming agreements which are valid for PLMN-1. The UE is at the same time:
  1) allowed, by subscription, to use UTRAN access provided by the operator of PLMN-2, but
  2) not allowed to use E-UTRAN access provided by the operator of PLMN-2.

If the operator of PLMN-1 has a cooperation with the operator of PLMN-2 to ensure good E-UTRAN area coverage, it may cause the operator of PLMN-1 to attempt to move the UE to be served by E-UTRAN at PLMN-2 when radio conditions are in favor to do so. However, since the UE is not allowed to access E-UTRAN at PLMN-2, the attempt to move the UE to be served by E-UTRAN at PLMN-2 will fail.

The HSS includes information about applicable access restrictions per PLMN ID of roaming agreements. This enables the SGSN/MME in the V-PLMN to serve the UE and apply access restrictions matching roaming agreements for the operator of the UE. The V-PLMN would as a result not attempt to move the UE to an access which is not allowed as per subscription.

When the UE roams into a V-PLMN, the HSS sends an Update Location Answer to the SGSN/MME in the V-PLMN which includes access restriction information in the form of a list of pairs (PLMN ID, RAT restriction). The receiving SGSN/MME uses the information to prevent attempts to move the UE to a location/access matching the entries in the list of restrictions.

However, adding such qualifying information cause an issue to configuration of the HSS and to signaling. The reason is that the list of restrictions would basically be a list of all RATs and PLMN IDs on a global scale. Even if it would be possible to limit the list of pairs (PLMN ID, RAT restriction) to entries applicable to the visited country only and potentially adjacent accesses in neighboring countries, the solution would still be inconvenient. The information may potentially be confidential since it will reveal roaming agreements. Signaling of the large amount of data is not feasible from a size and processing point of view. It would require HSS to be configured with roaming relations between V-PLMNs on a global scale.

SUMMARY

An objective of embodiments herein is therefore to obviate at least one of the above disadvantages and to provide improved handling of a UEs access to networks.

According to a first aspect, the object is achieved by a method performed by a mobility node for handling a UEs access to networks. The mobility node is located in a visiting network which is currently accessed by the UE. When the UE accesses the current visited network, the mobility node transmits, through the visited network to a subscriber server in a home network of the UE, a request for access information for the UE. The request comprises network information which indicates the current visited network and at least one potential visited network which the UE can access. The mobility node receives, from the subscriber server, the requested access information for at least some of the networks indicated in the request. The access information comprises allowed network IDs and corresponding allowed RATs for at least some of the networks indicated in the request which the UE is allowed to access. When the UE should access one of the potential visited networks, the mobility node determines based on the previously received access information, if the UE is allowed to access the potential visited network.

According to a second aspect, the object is achieved by a method performed by a subscriber server for handling a UEs access to networks. The subscriber server is located in a home network of a UE. When the UE accesses a current a visited network, the subscriber server receives, from a mobility node in the visited network, a request for access information for the UE. The request comprises network information which indicates the current visited network and at least one potential visited network which the UE can access. The subscriber server obtains the requested access information. The access information comprises allowed network IDs and corresponding allowed restricted RATs for at least some of the networks indicated in the request which the U) is allowed to access. The subscriber server transmits the requested restriction information to the mobility node.

According to a third aspect, the object is achieved by a method performed by a RAN node for handling a UEs access to networks. The RAN node is located in a visited network which is currently accessed by a UE. The RAN node receives access information from a mobility node. The access information comprises allowed network IDs and corresponding allowed RAT for the current visited network and at least one potential visited network which the UE is allowed to access. Based on the received access information, the RAN node determines that networks which do not match the received access information should not be used as potential visited networks for the UE.

According to a fourth aspect, the object is achieved by a mobility node arranged to handling a UEs access to networks. The mobility node is arranged to be located in a visiting network which is currently accessed by the UE. The mobility node is further arranged to, when the UE accesses the current visited network, transmit, through the visited network to a subscriber server in a home network of the UE, a request for access information for the UE. The request comprises network information which indicates the current visited network and at least one potential visited network which the UE can access. The mobility node is arranged to receive, from the subscriber server, the requested access information for at least some of the networks indicated in the request. The access information comprises allowed network IDs and corresponding allowed RATs for at least some of the networks indicated in the request which the UE is allowed to access. The mobility node is arranged to, when the UE should access one of the potential visited networks, determine, based on the previously received access information, if the UE is allowed to access the potential visited network.

According to a fifth aspect, the object is achieved by a subscriber server arranged to handle a UEs access to networks. The subscriber server is arranged to be located in a home network of a UE. The subscriber server is further arranged to, when the UE accesses a current a visited network, receive, from a mobility node in the visited network, a request for access information for the UE. The request comprises network information which indicates the current visited network and at least one potential visited network which the UE can access. The subscriber server is arranged to obtain the requested access information. The access information comprises allowed network IDs and corresponding allowed restricted RATs for at least some of the networks indicated in the request which the UE is allowed to access. The subscriber server is arranged to transmit the requested restriction information to the mobility node.

According to a sixth aspect, the object is achieved by a RAN node arranged to handle a UEs access to networks. The RAN node is arranged to be located in a visited network which is currently accessed by a UE. The RAN node is further arranged to receive access information from a mobility node. The access information comprises allowed network IDs and corresponding allowed RAT for the current visited network and at least one potential visited network which the UE is allowed to access. The RAN node is arranged to, based on the received access information, determine that networks which do not match the received access information should not be used as potential visited networks for the UE.

Since the mobility node includes all potential visited networks in the request sent to the subscriber server, the subscriber server is able to filter applicable relations from all its information and return only the associated allowed network IDs and RAT for the relevant potential visited networks. With this, the handling of a UEs access to networks is improved by that the mobility node can determine if a UE is allowed to access a potential visited network based on the information from the subscriber server.

Embodiments herein afford many advantages, of which a non-exhaustive list of examples follows:

Advantages of combination of information about RAT restriction with network IDs may be as follows It may enable the mobility node to prevent service interruption to the end user.

It may enable the operators to apply a better differentiation in roaming agreements.

It may cause less signaling/procedure failures (Key Performance Indicator (KPI) impact) at use of differentiation in roaming agreements.

Advantages of making the current serving mobility node providing the subscriber server with a list of relevant network IDs may be as follows:

The subscriber server may not need to be configured with roaming relations in visited networks. Information about its own roaming agreements is sufficient.

It may enable the response to the request message to include a limited list of only relevant restrictions and by that minimizes the signaling and processing impact to the answer message.

It may lower the signaling and processing load at the mobility node and the subscriber server.

Advantages of providing the restriction information to the RAN node or the wireless access node may be as follows:

The RAN node or the wireless access node may restrict the UE mobility/access changes to allowed targets only. The UE is not prevented service caused by futile attempts by the RAN node or the wireless access node to move the UE to a not allowed target The RAN node or the wireless access node may be enabled to instruct the UE to perform cell measurement of allowed targets cells only, as a preparation for handover as well as for idle mode move "release with redirection"

No KPI impact from handover failures (from that the RAN node or the wireless access node attempts to handover, but where the mobility node stops the handover when target is not allowed).

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein address the drawbacks of the current technology by letting the mobility node (e.g. represented by a SGSN/MME) in the visited network (e.g. a V-PLMN) to include information about all potential handover target networks (e.g. PLMNs) in the update location request message sent to the subscriber server, e.g. a HSS.

The mobility node, which may be already configured with information about overlaid and adjacent networks in order to enable handover and optimized idle mode mobility, includes a list of related network IDs in a message (e.g. an Update Location Request message) sent to the subscriber server.

The subscriber server receives the message and filters out applicable relations from its list of world-wide roaming agreements and creates a list of pairs with restrictions, a list of allowed network IDs and corresponding allowed RATs.

The subscriber server responds to the mobility node with a message (e.g. an Update Location Answer message) which includes the filtered list of access information (allowed network ID and corresponding allowed RAT).

The mobility node uses the new received access information of related access restrictions to prevent handover attempts by the RAN node to restricted targets and hence avoids that reason for service interruption to the UE.

In addition, the embodiments herein may enable the mobility node to forward the new access information to the RAN node. This may enable the RAN node to not initiate handover to a restricted target when in connected mode and to not perform "release with redirection" to a restricted target when in idle mode.

Figure 1:
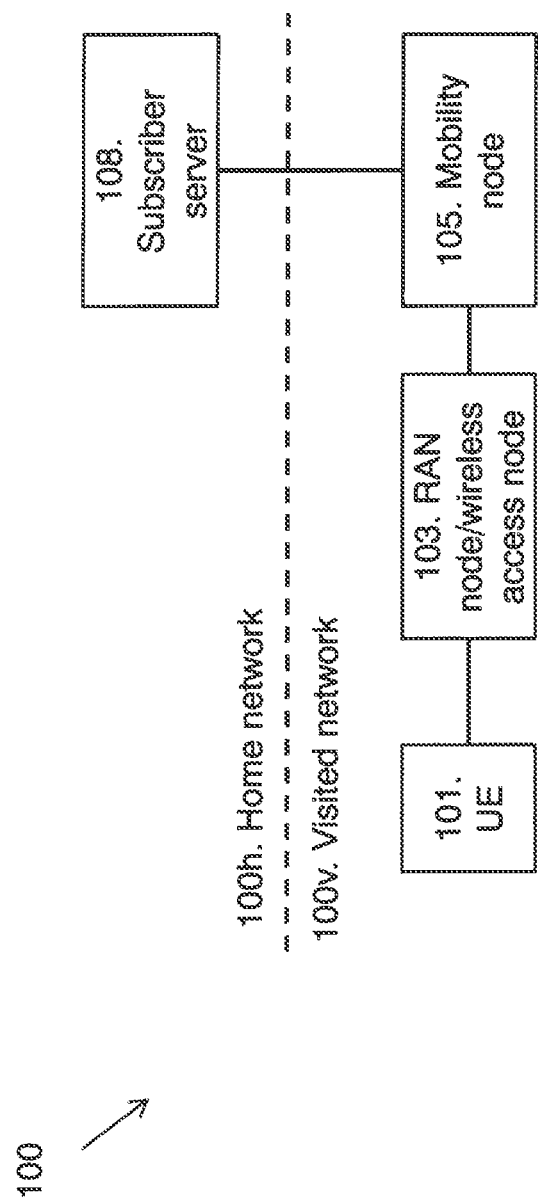
FIG. 1 is a schematic block diagram illustrating embodiments of a communications system.

FIG. 1 depicts a communications system 100 in which embodiments herein may be implemented. The communications system 100 may in some embodiments apply to one or more radio access technologies such as for example Long Term Evolution (LTE), LTE Advanced, Wideband Code Division Multiple Access (WCDMA), GSM, or any other Third Generation Partnership Project (3GPP) radio access technology, or other radio access technologies such as e.g. W-Fi or Wireless Local Area Network (WLAN) and Code Division Multiple Access (CDMA). The communications system 100 may also be referred to as e.g. a wireless communications network, a wireless communications system, a communications network, a communications system, a network or a system. The communications system 100 may comprise one or more Core Networks (CN) and a Radio Access Network (RAN).

The communications system 100 illustrated in FIG. 1 may be divided into a home network 100*h* and a visited network 100*v*. The horizontal dotted line in FIG. 1 illustrates the border between the home network 100*h* and the visited network 100*v*. The home network 100*h* is the home network of a UE 101 and may be also referred to as a H-PLMN a Home-Service Set (H-SS) or a Home-Wireless LAN (H-WLAN) etc. The visited network 100*v* is a network which is visited by the UE 101 and may also be referred to as a V-PLMN, a Visited-SS (V-SS) or a Visited-WLAN (V-WLAN) etc. FIG. 1 shows a scenario when the UE 101 visits the visited network 100*v*.

The home network 100*h* may be identified with a network ID. The network ID may be for example a PLMN ID, a Service Set Identifier (SSID), a WLAN ID or any other suitable unique identification of the home network 100*h*. Similarly, the visited network 100*v* may also be identified with a network ID, e.g. a PLMN ID, a SSID, a WLAN ID or any other suitable unique identifier of the visited network 100*v*.

The embodiments applies to a mixed network which means that a network may be a 3GPP network or a WLAN or another non-3GPP network such as CDMA, i.e. a network may not necessarily be identified by a PLMN, but other applicable identifiers may be used for identifying the networks, e.g. a SSID, a WLAN ID etc. as previously described.

As mentioned above, the communications system 100 comprises the UE 101. When the UE 101 is located in the visited network 100*v*, the UE is served by a RAN node 103 in the visited network 100*v*. The RAN node 103 may also be referred to as a wireless access node. In the following the terms RAN node, wireless access node, RAN node/wireless access node may be used interchangeably. The RAN node 103 may be for example an evolved Node B (eNB), a Node B (NB), a Base Station Controller (BSC), a Radio Network Controller (RNC), a Trusted Wireless Access Gateway (TWAG) or an evolved Packet Data Gateway (ePDG) etc.

The UE 101 may be a device by which a subscriber may access services offered by an operator's network and services outside the operator's network to which the operator's radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

In the visited network 100v, the RAN node 103 may be connected to a mobility node 105. The mobility node 105 is also located in the visited network 100v. The mobility node 105 is a node which is arranged to handle the mobility, roaming authentication etc. of the UE 101. The mobility node 105 may be for example an MME, an SGSN, a combined MME and SGSN node (the MME and SGSN are co-located in one node when they are combined), a TWAG or an ePDG. In some embodiments, the mobility node 105 may be seen as a node which implements one or more functions. The function may be described as a virtual function. The function may be an MME function, a SGSN function, a TWAG function, an ePDG function.

The mobility node 105 in the visited network 100v may be connected to a subscriber server 108 in the home network 100h. The subscriber server 108 is a node which is arranged to manage subscriber related information such as e.g. subscriber profiles. The subscriber server 108 may be for example a HSS, a Home Location Register (HLR), an Authentication Center (AuC) or an Authentication, Authorization, and Accounting (AAA) server.

It should be noted that the communication links in the communications network may be of any suitable kind including either a wired or wireless link. The link may use any suitable protocol depending on type and level of layer (e.g. as indicated by the Open Systems Interconnection (OSI) model) as understood by the person skilled in the art.

Figure 2:
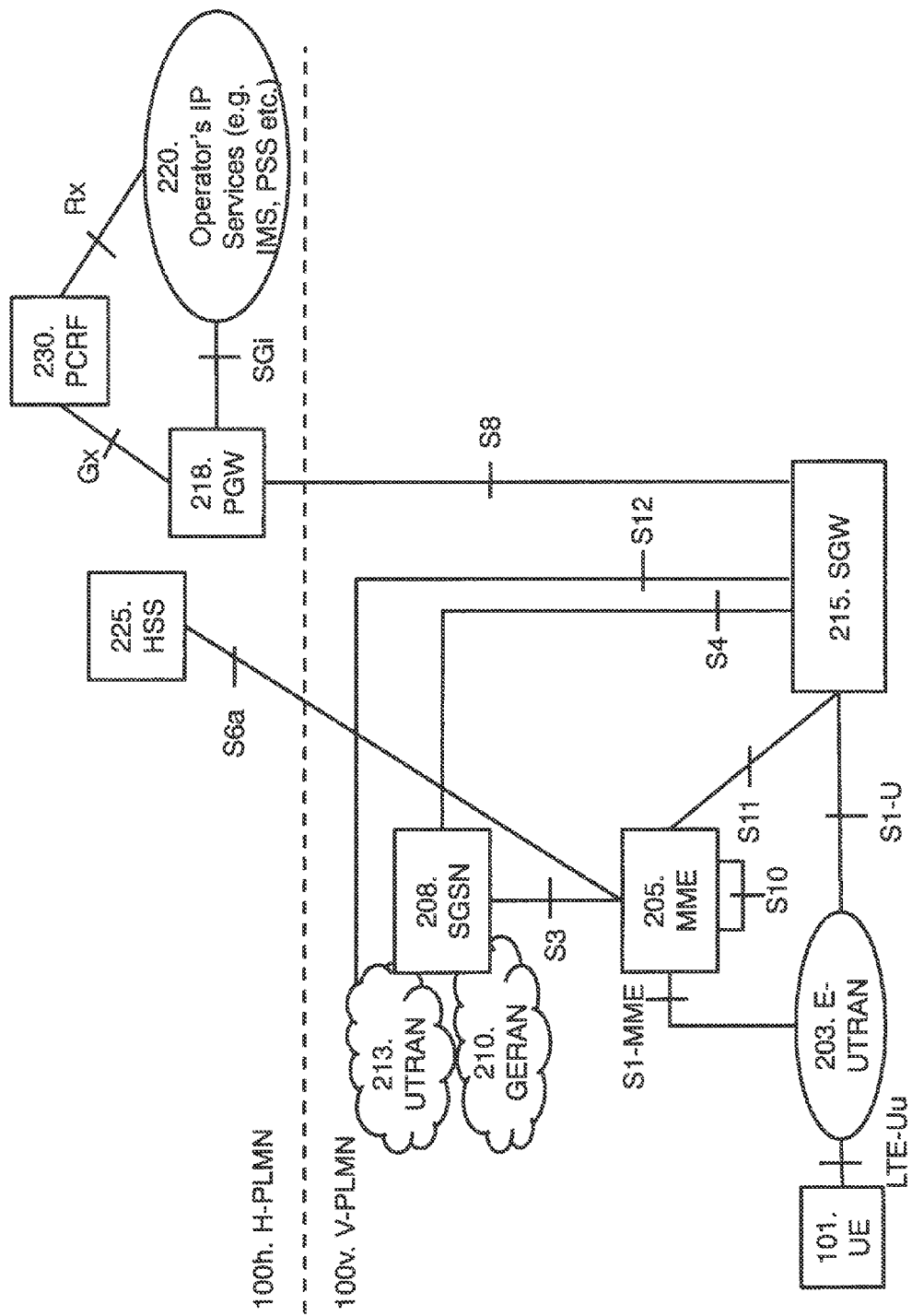
FIG. 2 is a schematic block diagram illustrating embodiments of a communications system.

A more detailed exemplary embodiment of the communications system 100a in FIG. 1 will now be described with reference to FIG. 2. The exemplary embodiment in FIG. 2 is a more detailed version of the communications system 100 seen in FIG. 1. FIG. 2 shows an example embodiment of a roaming architecture for 3GPP accesses. In FIG. 2, the home network 100h is represented by a H-PLMN 100h and the visited network 100v is represented by a V-PLMN 100v. The dotted line in FIG. 2 illustrates the border between the H-PLMN 100h and the V-PLMN 100v. Even though a PLMN is used as an example in FIG. 2, the embodiments herein are equally applicable to any other types of networks, e.g. a 3GPP network, a non-3GPP network, a WLAN etc.

FIG. 2 shows an E-UTRAN 203 in the V-PLMN 100v. The E-UTRAN 203 comprises elements such as the RAN node 103 in FIG. 1 (not shown in FIG. 2). As mentioned earlier, the RAN node 103 may be for example a base station, a NodeB, an eNode B, eNB, RNC, BSC etc. or any other element capable to communicate with the UE 101. The reference point between the UE 101 and the E-UTRAN 203 (and also the RAN node 103) may be referred to as LTE-Uu.

An MME 205 located in the V-PLMN 100v may be connected to the E-UTRAN 203 via the reference point S1-MME. The MME 205 is an element having functions such as e.g. Non-Access Stratum (NAS) signalling, Inter CN node signalling for mobility between 3GPP access networks, UE reachability, Tracking Area (TA) list management, Packet data network GateWay (PGW) and Serving GateWay (SGW) selection, MME selection for handover with MME change etc. S10 is the reference point between several MMES 205 for MME relocation and MME to MME information transfer. The MME 205 is an example of the mobility node 105 shown in FIG. 1.

The SGSN 208 is a node in the V-PLMN which is arranged to be responsible for the delivery of data packets from and to the UE's 101 within its geographical service area. One of the SGSN's 208 functions is to provide signaling for mobility between 2G/3G and E-UTRAN 203 3GPP access networks. 2G/3G access network are exemplified with GSM EDGE Radio Access Network (GERAN) 210 and UTRAN 213 in FIG. 2. EDGE is short for Enhanced Data rates for GSM Evolution. Some further functions of the SGSN 208 are to handle packet routing and transfer, mobility management (attach/detach and location management), logical link management, and authentication and charging functions etc. S3 is the interface between the SGSN 208 and the MME 205. In some embodiments, the SGSN 208 and the MME 205 are co-located in one node. In this text, the term MME/SGSN will refer to any one of a standalone MME 205 or a standalone SGSN 208 or a combined MME 205 and SGSN 208 node. The SGSN 208 may be an example of the mobility management node 105 in FIG. 1.

One gateway is located in the V-PLMN 100v in FIG. 2, i.e. the SGW 215. The SGW 215 is the gateway which terminates the interface towards E-UTRAN 203. The reference point between the SGW 215 and the E-UTRAN 203 for the per bearer user plane tunneling and inter eNodeB path switching during handover may be referred to as S1-U. The SGW 215 routes and forwards user data packets, while also acting as the mobility anchor for the user plane during inter-eNodeB handovers and as the anchor for mobility between LTE and other 3GPP technologies. S11 is the reference point between the SGW 215 and the MME 205. S4 is a reference point between the SGW 215 and the SGSN 208. S12 is the reference point between the SGW 215 and the UTRAN 213.

The PGW 218 is the gateway in the H-PLMN 200h which terminates the SGi interface towards the Packet Data Network (PDN). The PDN is illustrated in FIG. 2 by the Operator's IP Services (e.g. IMS, PSS etc.) 220 in the H-PLMN 100h. IP is short for Internet Protocol, IMS is short for IP Multimedia Subsystem or IM Multimedia core network Subsystem and PSS is short for Packet Switched Streaming. If the UE 105 is accessing multiple PDNs, there may be more than one PGW 218 for that UE 101. Functions of the PGW 218 are e.g. providing connectivity from the UE 101 to external PDNs by being the point of exit and entry of traffic for the UE 101, performing policy enforcement, packet filtering for each user, charging support, lawful interception and packet screening etc. S5 is the reference point which provides user plane tunnelling and tunnel management between the SGW 215 and the PGW 218.

The HSS 225 is located in the H-PLMN 100h and is a subscriber server node similar to the GSM Home Location Register (e.g. the HLR) and AuC. The HSS 225 comprises subscriber-related information (subscriber profiles), performs authentication and authorization of the user, and may provide information about the subscriber's location and IP information. The reference point S6a enables transfer of subscription and authentication data for authenticating/authorizing user access to the evolved system between the MME 208 and the 225. Note that the HSS 225 is only shown as an example in FIG. 2 and that any type of subscriber database may be used instead of the HSS 225, such as e.g. a HLR etc. The HSS 225 is an example of the subscriber database 105 in FIG. 1.

The Policy and Charging Rules Function (PCRF) 230 is located in the H-PLMN 100h and is a policy and charging control element. The PCRF 230 encompasses policy control decision and flow based charging control functionalities, it provides network control regarding the service data flow detection, gating, Quality of Service (QoS) and flow based charging etc. The PCRF 230 may be described as a functional entity which may be a standalone node or a function implemented in another node. The reference point Gx provides transfer of (e.g. QoS) policy and charging rules from the PCRF 230 to a Policy and Charging Enforcement Function (PCEF) in the PGW 218. Rx is the reference point which resides between the PCRF 230 and the Operator's IP Services 220. The Rx reference point is used to exchange application level session information between the PCRF 230 and the Application Function (AF) (not shown).

Summarized, the H-PLMN 100h exemplified in FIG. 2 and which is the home network of the UE 101 comprises the HSS 225, the PGW 218, the PCRF 230 and the operator's IP services 220. The V-PLMN 200v exemplified in FIG. 2 and which is visited by the UE 101 comprises the UE 101, the E-UTRAN 203, the MME 205, the SGSN 208 and the SGW 2125.

It should be noted that the communication links in the communications systems seen in FIGS. 1 and 2 may be of any suitable kind including either a wired or wireless link. The link may use any suitable protocol depending on type and level of layer (e.g. as indicated by the OSI model) as understood by the person skilled in the art.

The method for handling a UEs 101 access to networks according to some embodiments will now be described with reference to the signaling diagram depicted in FIG. 3. The method in FIG. 3 uses the example embodiment of the communications system 100 in FIG. 1 as an example. The method in FIG. 3 comprises at least some of the following steps, which steps may as well be carried out in another suitable order than described below:

Step 301

The mobility node 105 in the visited network 100v detects that the UE 101 has accessed the visited network 100v. In other words, the UE 101 has moved from e.g. the home network 100h to the visited network 100v. This may also be described as the UE 101 has entered the visited network 100v, that the UE 101 has been handed over from the home network 100h to the visited network 100v, that the UE 101 registers at the mobility node 105, that the UE registration can be moved from a core node in one network to a core network in another network, that there is a network change etc. This applies to a UE 101 in both connected state and to a UE 101 in idle state.

Step 302

When the mobility node 105 has detected that the UE 101 has accessed the visited network 100v, the mobility node 105 sends a request message to the subscriber server 108 in the home network 100h of the UE 101. The request message is a request for access information for the particular UE 101. The request message comprises network information. The network information indicates the visited network 100v which the UE 101 is visiting and at least one potential visited network which the UE 101 can access. The potential visited network may also be referred to as a potentially visited network.

The network information comprises the IDs of the networks, e.g. PLM ID, SSID etc. The IDs may be organized in the form of a list or any other suitable set of organizing the information. The visited network 100v and a potential visited network 100v may use different types of network identifiers. One of the networks may use a PLMN ID and the other may use for example SSID. In some embodiments, the RAT types associated with each network ID is also comprised in the network information.

A potential visited network may be an adjacent network which is adjacent to the visited network 100v or an overlapping network which geographically overlaps with the visited network 100v. The visited network 100v may also be described as a current visited network and is a network which the UE 101 is currently visiting. The potential visited network may also be referred to as a potential UE target networks at a network change.

The information sent in the request message may be as in Table 1 when the visited network 100v and the potential visited network are both V-PLMNs:

TABLE 1

| PLMN ID |
| --- |
| V-PLMN_1 (visited network) |
| V-PLMN_2 (potential visited network) |
| V-PLMN_3 (potential visited network) |
| V-PLMN_4 (potential visited network) |
| V-PLMN_5 (potential visited network) |
| V-PLMN_7 (potential visited network) |
| V-PLMN_8 (potential visited network) |
| V-PLMN_9 (potential visited network) |

Step 303

The subscriber server 108 receives the request message from the mobility node 105 and obtains the requested access information. The subscriber server 108 comprises information about access restrictions per network ID of roaming agreements, i.e. information about all RATs and networks on a global scale. This information may have been stored in the subscriber server 108 at an earlier point of time prior to the performance of the method according to the embodiments herein. The information may indicate networks of with which the home operator has a roaming agreement, or, is a network of the home operator itself.

An example of this stored information in the subscriber server 108 may be seen in Table 2 below:

TABLE 2

| Network ID | RAT |
| --- | --- |
| V-PLMN_1 | E-UTRAN |
| V-PLMN_1 | UTRAN |
| V-PLMN_1 | GERAN |
| V-PLMN_2 | UTRAN |
| V-PLMN_2 | GERAN |
| V-PLMN_3 | GERAN |
| V-PLMN_3 | Wi-Fi |
| V-PLMN_4 | E-UTRAN |
| V-PLMN_5 | E-UTRAN |
| V-PLMN_6 | Wi-Fi |
| V-PLMN 6 | GERAN |
| V-PLMN_7 | UTRAN |
| V-PLMN_7 | E-UTRAN |
| V-PLMN_8 | E-UTRAN |
| V-PLMN_9 | GERAN |
| V-PLMN_9 | Wi-Fi |
| V-PLMN_10 | Wi-Fi |
| V-PLMN_11 | E-UTRAN |
| V-PLMN_12 | GERAN |
| V-PLMN_12 | GERAN |
| V-PLMN_13 | UTRAN |
| V-PLMN_14 | Wi-Fi |

In order to obtain the requested access information, the subscriber server 108 filters the information about all RATs and networks (i.e. the information in Table 2) to obtain only information applicable to the visited network 100v and the potential visited network which was indicated in the request from step 302. The obtained information is then information which indicates the allowed network IDs and corresponding allowed RATs for at least some of the networks indicated in the request which the UE 101 is allowed to access.

The obtained access information may be as exemplified in Table 3: Access information for UE 101 below, where the network ID for the potential visited network which the UE 101 is allowed to access is seen the left column and the allowed RAT associated with the allowed ID. From the table below, it is seen that the allowed network ID and the allowed RAT are organized in pairs. This may also be described as the allowed network ID is associated with at least one allowed RAT, or that the allowed network ID has a corresponding allowed RAT or that an allowed RAT has a corresponding network ID.

TABLE 3

Access information for UE 101

| Allowed Network ID | Allowed RAT |
| --- | --- |
| V-PLMN_2 | E-UTRAN |
| V-PLMN_2 | UTRAN |
| V-PLMN_3 | UTRAN |
| V-PLMN_3 | GERAN |
| V-PLMN_3 | Wi-Fi |
| V-PLMN_4 | E-UTRAN |

Step 304

The subscriber server 108 transmits the access information to the mobility node 108 (the information in Table 3: Access information for UE 101. The transmission of the access information may be sent in a response message which is a response to the request message in step 302. The access information comprises allowed network IDs and corresponding allowed RATs for at least some of the networks indicated in the request which the UE 101 is allowed to access.

The transmitted information represents the positive outcome, i.e. where the UE 101 would be granted access if that was attempted. The transmitted information may be described as the subset of all roaming agreements which matches the information provided in the request in step 302 plus applicable accesses of the UE home operator itself.

In some embodiments, only those PLMNs with active RAT restrictions should be sent by the subscriber server 108.

The information may be sent in the form of the value pair [Network ID (=PLMN ID), RAT type]. Thus, here is a relation between Network ID and a RAT.

Step 305

The mobility node 108 may transmit the access information to the RAN node 103. In some embodiments, the mobility node 108 forwards the access information to the RAN node 103 without doing any processing of the information. In other embodiments, the mobility node 108 may process or reorganize the information before transmitting it to the RAN node 103. This step 305 may be performed after step 304 or after step 306.

Step 306

When the UE 101 is about to access a particular potential visited network, the mobility node 105 determines if the UE 101 is allowed to access this particular potential visited network. The decision is taken based on the information received in step 305. For example, if the particular potential visited network which the UE 101 is about to access is V-PLMN_3 and the RAT is GERAN, the mobility node 105 sees from Table 3: Access information for UE 101 that V-PLMN_3 and GERAN is allowed for the UE 101.

For example, the ID of the target PLMN matches the received PLMN ID in the list of adjacent networks, and the RAT of the target node matches an active RAT restriction for that UE 101 in that target PLMN.

The embodiments herein indicate a "potential visited network" by the value pair [network ID, RAT type] (e.g. [PLMN ID, RAT type]), and at all times of comparison match a value pair with another value pair. A successful comparison is when a pair matches another pair, i.e. both values match individually.

Step 307

Based on the information received in step 305, the RAN Node 103 determines that a particular network should not be used as a potential visited network. Step 307 may be performed directly after step 305 or after step 306. This may involve using the information to avoid those as potential targets for the UE 101:

Exclude access restrictions from cell measurement.
Exclude access restrictions as handover targets.
Exclude access restrictions as redirection targets when the RAN node 103 releases that UE 101 radio access to the network.

Figure 4:
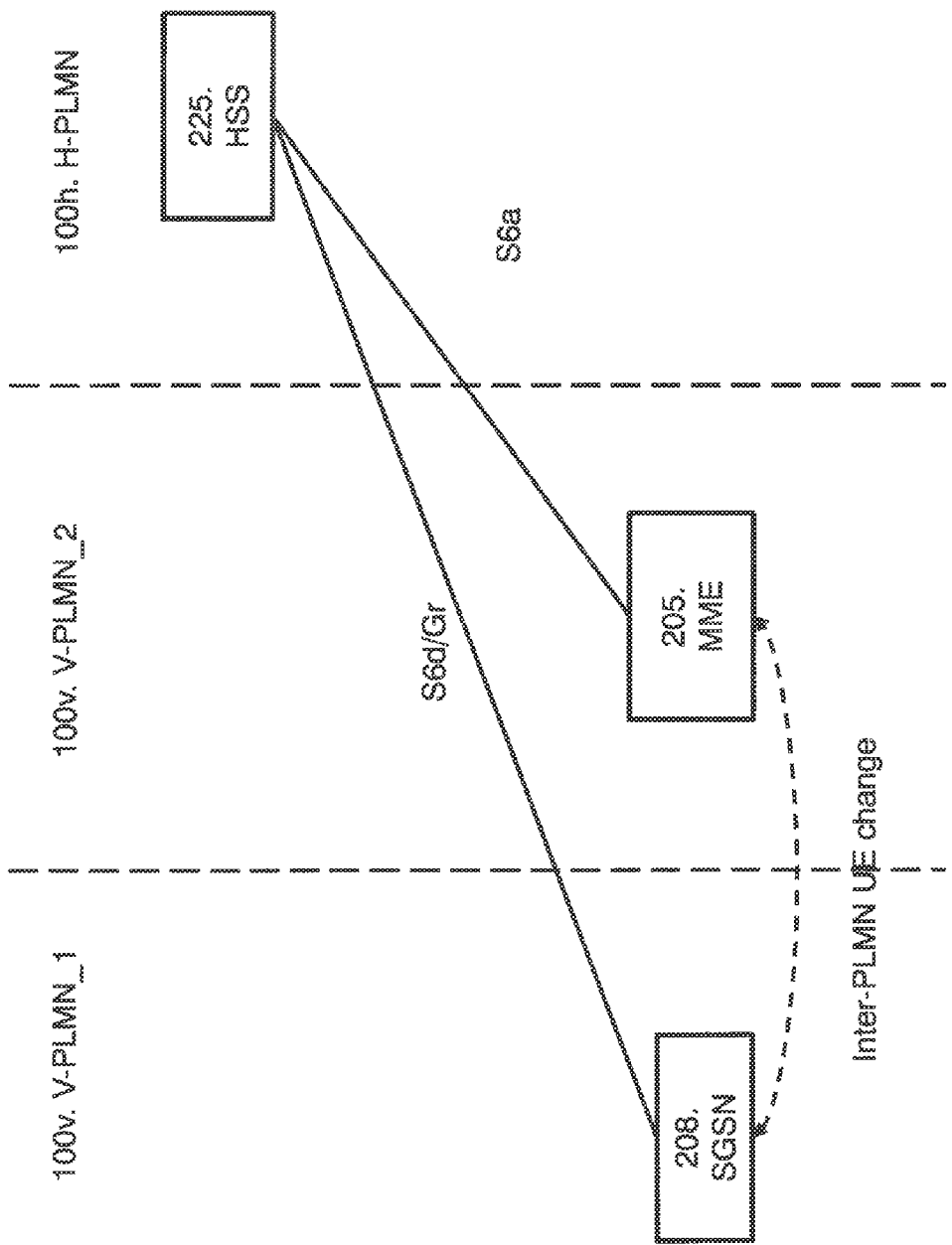
FIG. 4 is a schematic block diagram illustrating network elements and reference points

FIG. 4 is a schematic block diagram illustrating network elements and reference points which are applicable to the embodiments herein. FIG. 4 uses the example embodiment of the communications system 100 in FIG. 2 as an example. In FIG. 4, the V-PLMN_1 which the UE 101 visits is seen on the left side in FIG. 4. The V-PLMN 1 comprises the SGSN 208. The V-PLMN_2 in FIG. 2 comprises a MME 205 and is a potential visited network 100v which the UE 101 can access. The home network H-PLMN 100h of the UE 101 is seen to the right in FIG. 4 and comprises a HSS 225. The reference point between the SGSN 208 in the current visited network 100v is referred to as S6d or Gr. The reference point between the MME 205 in the potential visited network and the HSS 225 is referred to as S6a. An inter-PLMN change of the UE 101 may take place between the current visited network V-PLMN_1 and the potential visited network V-PLMN_2, indicated with a dotted arrow in FIG. 4. The inter-PLMN change may in some example embodiments be referred to as an inter-PLMN handover of the UE 101 or an inter-PLMN move of the UE 101.

The method for handling a UEs 101 access to networks according to some embodiments will now be described with reference to the signaling diagram depicted in FIG. 5. The method in FIG. 5 uses the example embodiment of the communications system 100 in FIGS. 2 and 4 as an example. The method in FIG. 5 comprises at least some of the following steps, which steps may as well be carried out in another suitable order than described below:

Step 501

Figure 3:
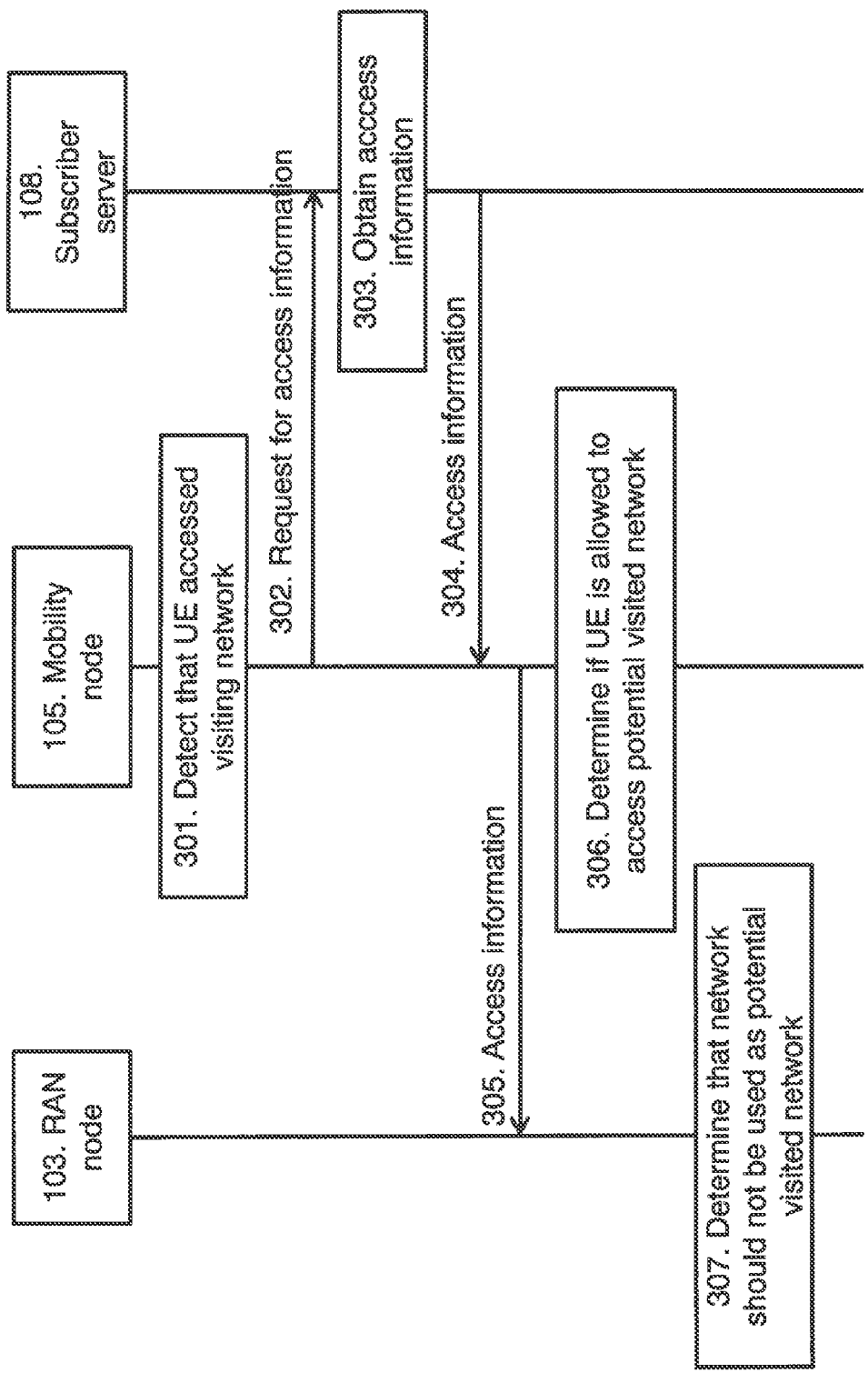
FIG. 3 is a signaling diagram illustrating embodiments of a method.

This step corresponds to step 302 in FIG. 3. The SGSN 208 in the current visited network V-PLMN_1 sends an Update Location Request message to the HSS 225 in the home network H-PLMN of the UE 101. The message comprises information indicating adjacent PLMNs. An adjacent PLMN is a PLMN that is adjacent to the current visited network. In the example embodiment in FIG. 5, PLMN_2 is an adjacent network. The information indicating adjacent PLMNs corresponds to the network information transmitted in step 302 in FIG. 3.

The information indicating adjacent PLMNs may be in the form of an information element and may called "Adjacent PLMNs". The Adjacent PLMN information element may be of category Optional (O). This information element, if present, shall contain the list of PLMNs where an UE 101 served by the MME/SGSN 205, 208 is likely to make a handover from the PLMN where the MME/SGSN 205, 208 is located. This list is statically configured by the operator in the MME/SGSN 205, 208, according to the geographical disposition of the different PLMNs in that area, the roaming agreements, etc.

Step 502

This step corresponds to step 303 in FIG. 3. The HSS 225 fetches Access Restriction Data (ARD) for the current visited PLMN (e.g. V-PLMN_1 100v) and the adjacent PLMNs (e.g. V-PLMN_2) which was indicated in the Update Location Request message in step 501. The ARD corresponds to the access information obtained in step 303 in FIG. 3.

If the HSS 225 receives a list of adjacent PLMNs from the MME/SGSN 205, 208 in the Adjacent-PLMNs Attribute Value Pair (AVP), the HSS 225 may send the associated Access Restriction Data for each of those PLMNs, in the VPLMN-Access-Restriction-Data AVP, so the MME/SGSN 205, 208 can use this information to allow, or prevent, inter-RAT inter-PLMN handovers towards any of the PLMNs indicated by the HSS 225.

The abbreviation AVP mentioned above is short for Attribute Value Pair and is a set of representing data.

Step 503

This step corresponds to step 304 in FIG. 3. The HSS 225 sends an Update Location Answer message to the SGSN 208 in the current visited network V-PLMN_1 100v. The Update Location Answer message comprises the ARD for both the PLMN_1 and PLMN_2 in the Subscription Data. The ARD for the PLMN_1 and PLMN_2 corresponds to the Access information which is transmitted to the mobility node 105 in step 304 in FIG. 3.

When the SGSN 208 receives Access-Restriction-Data or VPLMN-Access-Restriction-Data AVPs within the Subscription-Data AVP, the MME 205 or SGSN 208 shall replace the corresponding stored information (if any) with the new received information, rather than adding received information to stored information.

The AVPs may be referred to as Adjacent-PLMNs and VPLMN-Access-Restriction-Data.

The adjacent PLMNs AVP may be of type Grouped (G). This AVP may contain a list of PLMN IDs where an UE 101 served by the mobility node 105 (e.g. the MME 205 or the SGSN 208) is likely to make a handover from the PLMN where the mobility node 105 (e.g. the MME 205 or the SGSN 208) is located. The adjacent PLMNs AVP format may be as follows:

```
Adjacent-PLMNs ::= <AVP header: aaaa 10415>
   1*{ Visited-PLMN-Id }
   *[AVP]
```

The VPLMN-Access Restriction-Data AVP may be of type Grouped. This AVP may contain a pair of PLMN ID and the associated Access Restriction Data for that PLMN. The AVP format of VPLMN-Access Restriction-Data may be as follows:

```
VPLMN-Access-Restriction-Data ::= <AVP header: bbbb 10415>
   { Visited-PLMN-Id }
```

```
   { Access-Restriction-Data }
   *[AVP]
```

Step 504

This step corresponds to step 306 in FIG. 3. The SGSN 208 in the current visited network V-PLMN_1 determines if an inter-PLMN change of the UE 101 should be performed to the adjacent PLMN_2. The decision is taken by the SGSN 208 based on the information in the Update Location Answer message in step 503. The attempted change may be:
   a change of PLMN only,
   a change of PLMN and RAT,
   a change of RAT only.

Step 505

This step corresponds to step 306 in FIG. 3. The SGSN 208 in the current visited network Summarizing FIG. 5, the Update Location Request message comprises a list of PLMN-ID's (as part of the Adjacent-PLMNs AVP). Then, in the response, the HSS/HLR 225 effectively sends back a list of pairs [PLMN-ID, Access-Restriction], where each Access-Restriction indicates the allowed/forbidden RATs for that UE 101 and that PLMN-ID.

It is not required to have value pairs in the Update Location Request message. For the SGSN/MME 205, 208 to execute on a restriction value pair {PLMN, RAT}, the SGSN/MME 205, 208 must be aware about if that specific scenario is at hand.

Therefore, it may be possible for the SGSN/MME 205, 208 to provide value pairs in the Update Location Request message since they are anyway known to the SGSN/MME 205, 208.

The SGSN/MME 205, 208 may transmit the value pair to the RAN node 103, and the RAN node 103 executes on the information. In such embodiment it is the RAN node 103 that evaluates if a target value pair is allowed or not.

V-PLMN_1 100v checks if the RAT (e.g. E-UTRAN) associated with the MME 205 in the potential visited network V-PLMN_2 100v is allowed. The check is performed based on the ARD of V-PLMN_2.

Step 506

This step corresponds to step 306 in FIG. 3. Based on the check performed in step 504 and 505, the handover of the UE 101 is allowed or rejected.

Figure 5:
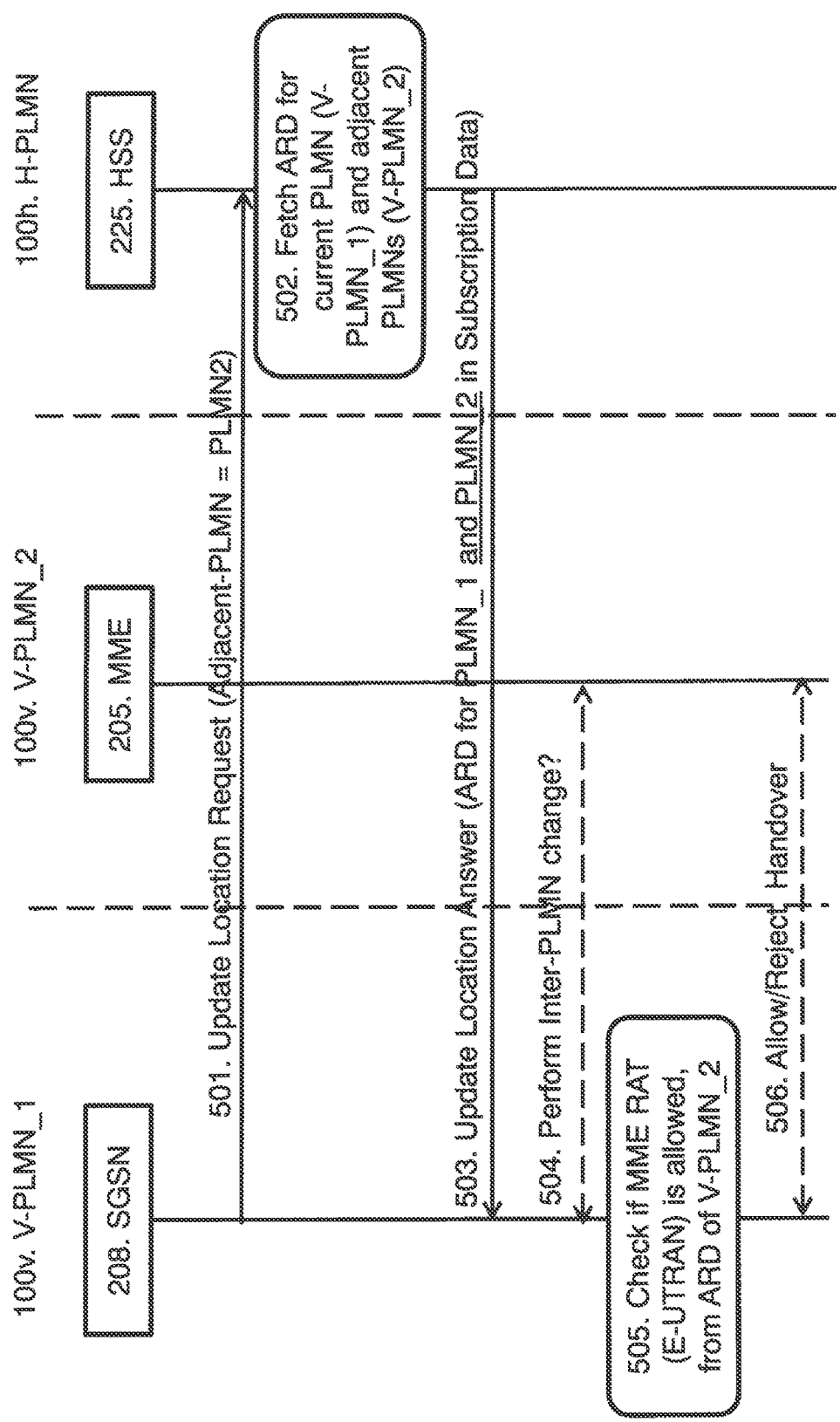
FIG. 5 is a signaling diagram illustrating embodiments of a method.

In the example embodiment illustrated in FIG. 5, the UE 101 is initially served by the SGSN 208 in the current visited network V-PLMN_1 100v. The SGSN 208 receives information from the HSS 225. As an effect the SGSN 208 is able to prevent a RAN node 103 (e.g. a BSC or an RNC) at the current visited network 100v to start handover of the UE 101 if the target is not part of the information from HSS 225. With RAN impact, the RAN node 103 will not attempt a handover, and not provide the UE 101 with guiding information about not allowed targets, i.e. prevent "release with redirection" and cell measurement of such targets.

Figure 6:
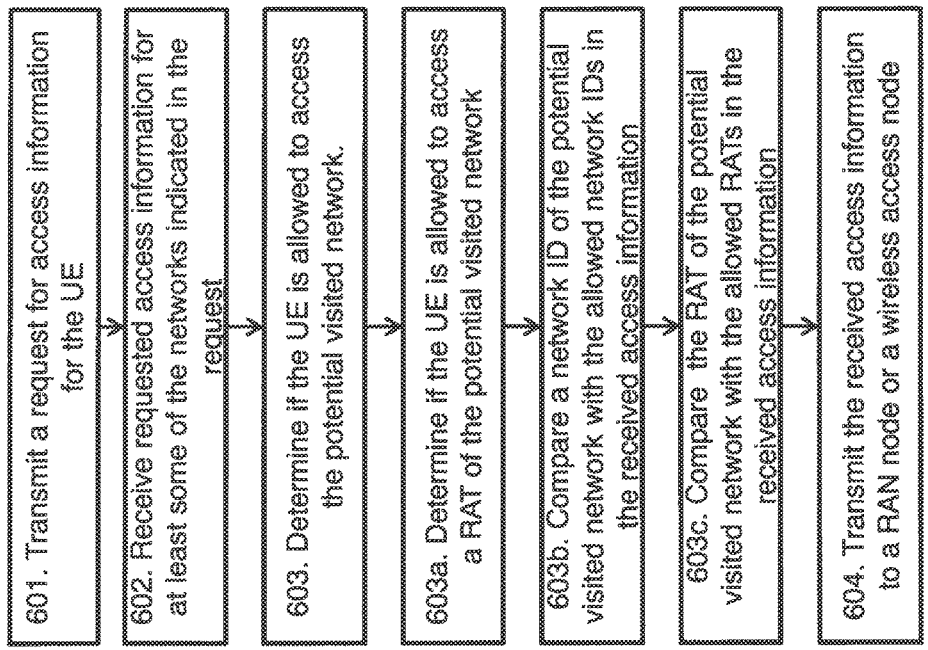
FIG. 6 is a flow chart illustrating embodiments of a method performed by a mobility node.

The method described above will now be described seen from the perspective of the mobility node 105. FIG. 6 is a flowchart describing the present method in the mobility node 105 for handling a UEs 101 access to networks. The mobility node 105 is located in a visiting network 100v which is currently accessed by the UE 101. The mobility node 105 may be an MME or an SGSN or a combined MME and SGSN or a TWAG or an ePDG. The method in FIG. 6 comprises at least some of the following steps to be performed by the mobility node 105:

Step 601

This step corresponds to step 302 in FIG. 3 and step 401 in FIG. 4. When the UE 101 accesses the current visited network 100v, the mobility node 105 transmits, through the visited network to a subscriber server 108 in a home network 100h of the UE 101, a request for access information for the UE 101. The request comprises network information which indicates the current visited network 100v and at least one potential visited network which the UE 101 can access.

The request for access information may be a dedicated message for the request for access information, or the request for access information may be sent in an Update Location Request message.

The current visited network may be a current visited PLMN and the potential visited network is a potential visited PLMN. The current visited network 100v comprises one or more RAT and the potential visited network comprises one or more RAT. This may also be described as the current visited network 100 supports or implements one or more RATs and the potential visited network supports or implements one or more RATs. The RAT may be a 3GPP RAN or a non-3GPP RAN.

Step 602

This step corresponds to step 304 in FIG. 3 and step 403 in FIG. 4. The mobility node 105 receives, from the subscriber server 108, the requested access information for at least some of the networks indicated in the request. The access information comprises allowed network IDs and corresponding allowed RATs for at least some of the networks indicated in the request which the UE 101 is allowed to access.

In some embodiments, each allowed network ID has at least one corresponding allowed RAT. In some embodiments, each allowed network ID and its corresponding allowed RAT are organized in a pair.

The access information may be received in a dedicated message for the access information, or the access information may be received in an Update Location Answer message.

The network ID of the potential visited network may be a PLMN ID or a SSID and the allowed network ID may be an allowed PLMN ID or an allowed SSID.

Step 603

This step corresponds to step 405 in FIG. 4. When the UE 101 should access one of the potential visited networks, the mobility node 105 determines, based on the previously received access information, if the UE 101 is allowed to access the potential visited network.

In some embodiments, the UE 101 is allowed to access the potential visited network when the network ID of the potential visited network matches an allowed network ID in received access information and when the RAT of the potential visited network matches an allowed RAT in the received access information. The allowed network ID and the allowed RAT may be associated with each other.

In some embodiments, the UE 101 is not allowed to access the potential visited network when at least one of:
the network ID of the potential visited network does not match the allowed network ID, and
the RAT of the potential visited network does not match the allowed RAT.

Step 603a

This step corresponds to step 405 in FIG. 4. This step is seen as a substep of step 603. In some embodiments, the mobility node 105 determines, based on the previously received access information, if the UE 101 is allowed to access a RAT of the potential visited network.

Step 603b

This step corresponds to step 306 in FIG. 3 and step 405 in FIG. 4. This step is a substep of step 603. In some embodiments, the mobility node compares a network ID of the potential visited network with the allowed network IDs in the received access information.

Step 603c

This step corresponds to step 306 in FIG. 3 and step 405 in FIG. 4. This step is a substep of step 603. Steps 603b may be performed before step 603c, or step 603c may be performed before step 603b. In some embodiments, only one of the steps 603b and 603c is performed. In other embodiments, both steps 603b and 603c are performed. In some embodiments, the mobility node compares the RAT of the potential visited network with the allowed RATs in the received access information.

Step 604

This step corresponds to step 305 in FIG. 3. In some embodiments, the mobility node transmits the received access information to a RAN node 103 or a wireless access node 103.

Figure 7:
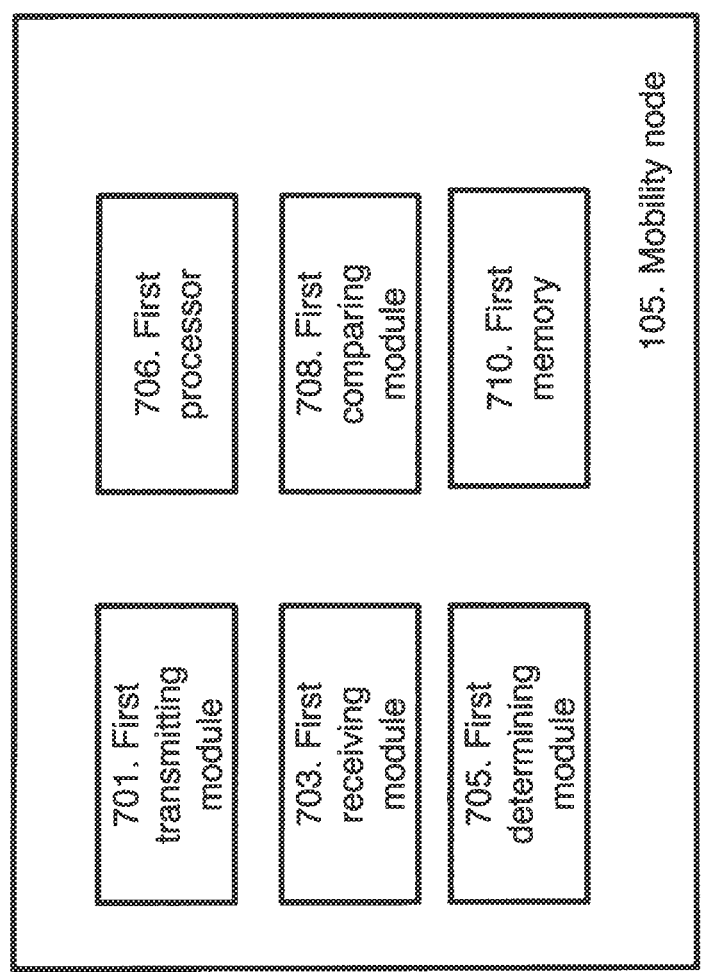
FIG. 7 is a schematic block diagram illustrating embodiments of a mobility node.

To perform the method steps shown in FIG. 6 for handling a UEs 101 access to networks the mobility node 105 may comprise an arrangement as shown in FIG. 7. The mobility node 105 is arranged to be located in a visiting network 100v which is currently accessed by the UE 101.

The mobility node 105 is further arranged to, e.g. by means of a first transmitting module 701, when the UE 101 accesses the current visited network 100v, transmit, through the visited network to a subscriber server 108 in a home network 100h of the UE 101, a request for access information for the UE 101. The request comprises network information which indicates the current visited network 100v and at least one potential visited network which the UE 101 can access. The first transmitting module 701 may also be referred to as a first transmitting unit, a first transmitting means, a first transmitting circuit, first means for transmitting, first output unit. The first transmitting module 701 may be a transmitter, a transceiver etc. The first transmitting module 701 may be a wireless transmitter of the mobility node 105 of a wireless or fixed communications system.

The mobility node 105 is arranged to, e.g. by means of a first receiving module 703, receive, from the subscriber server 108, the requested access information for at least some of the networks indicated in the request, wherein the access information comprises allowed network IDs and corresponding allowed RATs for at least some of the networks indicated in the request which the UE 101 is allowed to access. The first receiving module 703 may also be referred to as a first receiving unit, a first receiving means, a first receiving circuit, first means for receiving, first input unit. The first receiving module 703 may be a receiver, a transceiver etc. The first receiving module 703 may be a wireless receiving of the mobility node 105 of a wireless or fixed communications system.

The mobility node 105 is arranged to, e.g. by means of a first determining module 705, when the UE 101 should access one of the potential visited networks, determine, based on the previously received access information, if the UE 101 is allowed to access the potential visited network. The first determining module 705 may also be referred to as a first determining unit, a first determining means, a first determining circuit, first means for determining, etc. The first determining module 705 may be a first processor 706 comprised in the mobility node 105.

The mobility node 105 may be arranged to, e.g. by means of the determining module 705, determine, based on the previously received access information, if the UE 101 is allowed to access a RAT of the potential visited network.

The mobility node 105 may be further arranged to, e.g. by means of a first comparing module 708, compare a network ID of the potential visited network with the allowed network IDs in the received access information, and to compare the RAT of the potential visited network with the allowed RATs in the received access information. The first comparing module 708 may also be referred to as a first comparing unit, a first comparing means, a first comparing circuit, first means for comparing, etc. The first comparing module 708 may be the processor 706 comprised in the mobility node 105.

Each allowed network ID may have at least one corresponding allowed RAT, and each allowed network ID and its corresponding allowed RAT may be organized in a pair.

The UE 101 may be arranged to be allowed to access the potential visited network when the network ID of the potential visited network matches an allowed network ID in received access information and when the RAT of the potential visited network matches an allowed RAT in the received access information. The allowed network ID and the allowed RAT are associated with each other.

The UE 101 may be arranged to be not allowed to access the potential visited network when at least one of:
the network ID of the potential visited network does not match the allowed network ID, and
the RAT of the potential visited network does not match the allowed RAT.

The mobility node 105 may be further arranged to, e.g. by means of the transmitting module 701, transmit the received access information to a RAN node 103 or a wireless access node 103.

The request for access information may be a dedicated message for the request for access information, or the request for access information may be sent in a Update Location Request message. The access information may be arranged to be received in a dedicated message for the access information, or the access information may be arranged to be received in an Update Location Answer message.

The current visited network may be a current visited PLMN and the potential visited network is a potential visited PLMN.

The current visited network 100*v* may comprise one or more RAT and the potential visited network comprises one or more RAT.

The RAT may be a 3GPP RAN or a non-3GPP RAN.

The network ID of the potential visited network may be a PLMN ID or a SSID and the allowed network ID may be an allowed PLMN ID or an allowed SSID.

The mobility node 105 may be an MME or an SGSN or a combined MME and SGSN or a TWAG or an ePDG.

The mobility node 105 may further comprise a first memory 710 comprising one or more memory units. The first memory 710 is arranged to be used to store data, received data streams, power level measurements, access information, RAT information, PLMN information, network information, request messages, response messages, network IDs, threshold values, time periods, configurations, schedulings, and applications to perform the methods herein when being executed in the mobility node 105.

Those skilled in the art will also appreciate that the first transmitting module 701, the first receiving module 703, the first determining module 705 and the first comparing module 708 described above may refer to a combination of analog and digital circuits, and/or one or more processors configured with software and/or firmware, e.g. stored in a memory, that when executed by the one or more processors such as the first processor 706 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a first computer program may comprise instructions which, when executed on at least one processor (e.g. the first processor 706), cause the at least one processor to carry out the method steps 601-604. A first carrier (e.g. the first memory 710) may comprise the first computer program, and the first carrier is one of an electronic signal, optical signal, radio signal or computer readable storage medium.

Figure 8:
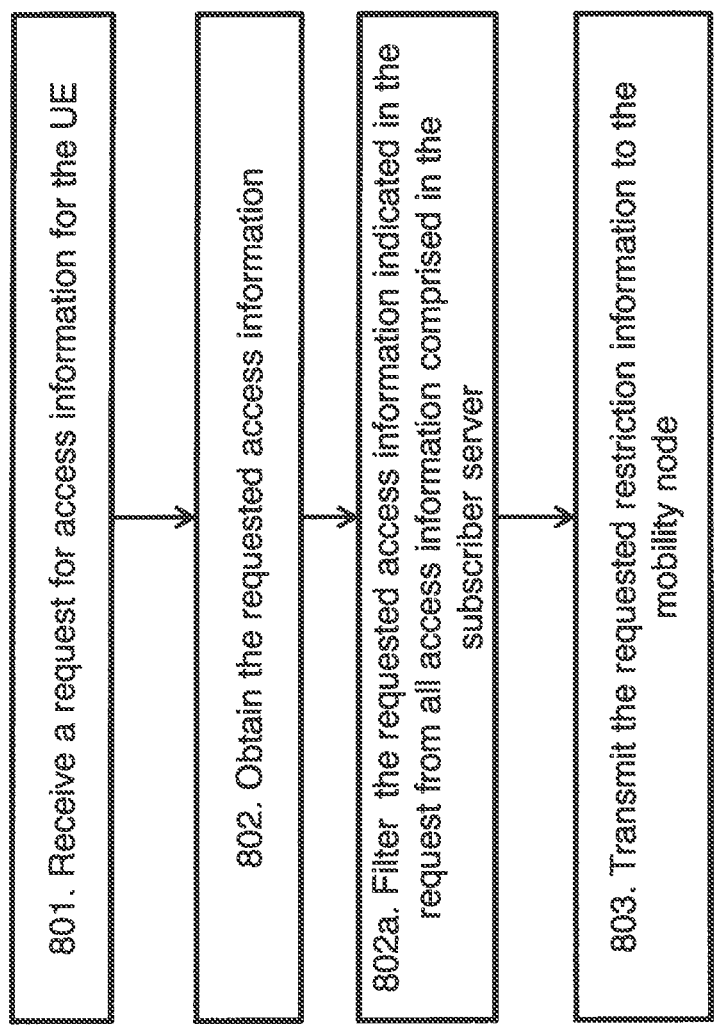
FIG. 8 is a flow chart illustrating embodiments of a method performed by a subscriber server.

The method described above will now be described seen from the perspective of the subscriber server 108. FIG. 8 is a flowchart describing the present method in the subscriber server 108 for handling a UEs 101 access to networks. The subscriber server 108 is located in a home network 100*h* of a UE 101. The subscriber server 108 may be an HSS or an HLR or an AAA server. The method in FIG. 8 comprises at least some of the following steps to be performed by the subscriber server 108:

Step 801

This step corresponds to step 302 in FIG. 3 and step 401 in FIG. 4. When the UE 101 accesses a current a visited network 100*v*, the subscriber server 108 receives, from a mobility node 105 in the visited network 100*v*, a request for access information for the UE 101. The request comprises network information which indicates the current visited network 100*v* and at least one potential visited network which the UE 101 can access.

The potential visited network which the UE 101 access may be at least one of an adjacent network which is adjacent to the current visited network 100*v* and an overlapping network which overlaps with the current visited network 100*v*.

The requested access information may be transmitted as part of subscription data to the mobility node 105.

Step 802

This step corresponds to step 303 in FIG. 3 and step 402 in FIG. 4. The subscriber server 108 obtains the requested access information. The access information comprises allowed network IDs and corresponding allowed restricted RATs for at least some of the networks indicated in the request which the UE 101 is allowed to access.

The allowed network IDs and corresponding allowed restricted RAT may be organized in pairs (e.g. in a list) in the subscriber server 108.

Step 802*a*

This step corresponds to step 303 in FIG. 3 and step 402 in FIG. 4. This step is a substep of step 802. In some embodiments, the subscriber server filters the requested access information indicated in the request from all access information comprised in the subscriber server 108.

Step 803

This step corresponds to step 340 in FIG. 3. The subscriber server 108 transmits the requested restriction information to the mobility node 105.

The amount of transmitted access information may be smaller than the amount of all access information comprised in the subscriber server 108.

Figure 9:
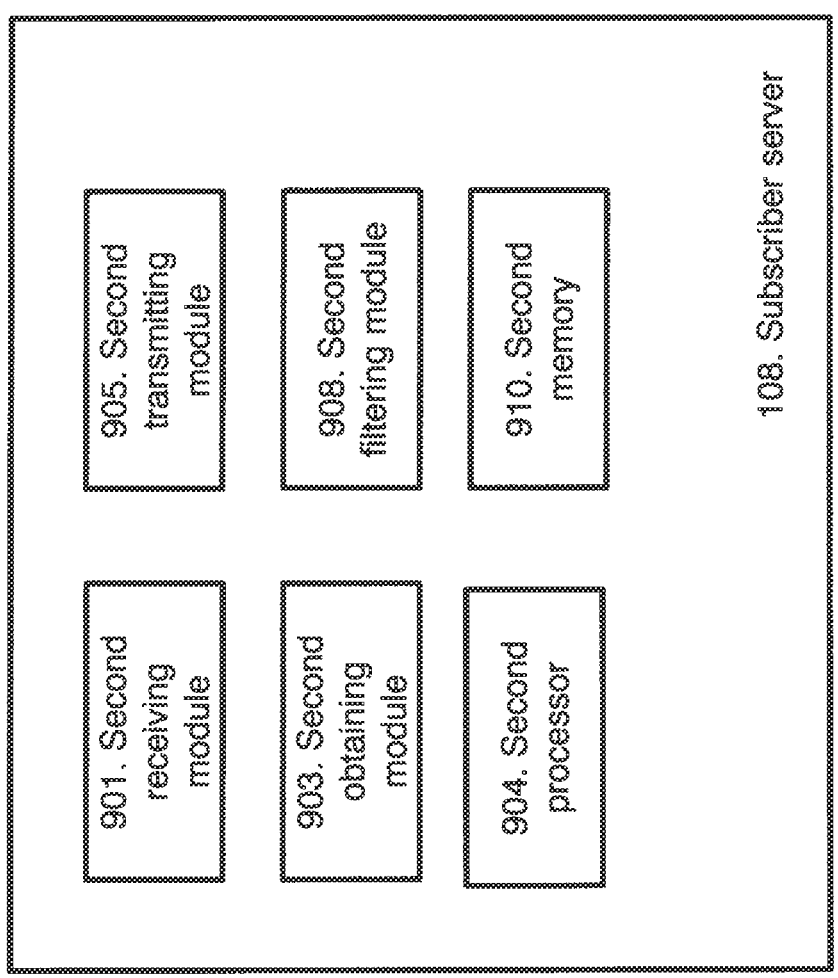
FIG. 9 is a schematic block diagram illustrating embodiments of a subscriber server.

To perform the method steps shown in FIG. 8 for handling a UEs 101 access to networks the subscriber server 108 may comprise an arrangement as shown in FIG. 9. The subscriber server 108 may be an HSS or an HLR or an AAA server. The subscriber server 108 is arranged to be located in a home network 100*h* of a UE 101.

The subscriber server 108 is further arranged to, e.g. by means of a second receiving module 901, when the UE 101 accesses a current a visited network 100*v*, receive, from a mobility node 105 in the visited network 100*v*, a request for access information for the UE 101. The request comprises network information which indicates the current visited network 100*v* and at least one potential visited network which the UE 101 can access. The requested access information may be arranged to be transmitted as part of subscription data to the mobility node 105. The second receiving module 901 may also be referred to as a second receiving unit, a second receiving means, a second receiving circuit, second means for receiving, second input unit. The second receiving module 01 may be a receiver, a transceiver etc. The second receiving module 901 may be a wireless receiver of the subscriber server 108 of a wireless or fixed communications system.

The subscriber server 108 is arranged to, e.g. by means of a second obtaining module 903, obtain the requested access information. The access information comprises allowed network IDs and corresponding allowed restricted RATs for at least some of the networks indicated in the request which the UE 101 is allowed to access. The second obtaining module 903 may also be referred to as a second obtaining unit, a second obtaining means, a second obtaining circuit, second means for obtaining. The second obtaining module 903 may be a second processor 904 of the subscriber server 108.

The subscriber server 108 is arranged to, e.g. by means of a second transmitting module 905, transmit the requested restriction information to the mobility node 105. The amount of transmitted access information may be smaller than the amount of all access information comprised in the subscriber server 108. The second transmitting module 905 may also be referred to as a second transmitting unit, a second transmitting means, a second transmitting circuit, second means for transmitting, second output unit. The second transmitting module 05 may be a transmitter, a transceiver etc. The second transmitting module 905 may be a wireless transmitter of the subscriber server 108 of a wireless or fixed communications system.

The allowed network IDs and corresponding allowed restricted RAT may be arranged to be organized in pairs in the subscriber server 108.

In some embodiments, the subscriber server 108 is further arranged to, e.g. by means of a second filtering module 908, filter the requested access information indicated in the request from all access information comprised in the subscriber server 108. The second filtering module 908 may also be referred to as a second filtering unit, a second filtering means, a second filtering circuit, second means for filtering. The second filtering module 908 may be the second processor 904 of the subscriber server 108.

The potential visited network which the UE 101 access may be at least one of an adjacent network which is adjacent to the current visited network 100*v* and an overlapping network which overlaps with the current visited network 100*v*.

The subscriber server 108 may further comprise a second memory 910 comprising one or more memory units. The second memory 910 is arranged to be used to store data, received data streams, power level measurements, access information, RAT information, PLMN information, network information, request messages, response messages, network IDs, threshold values, time periods, configurations, schedulings, and applications to perform the methods herein when being executed in the subscriber server 108.

Those skilled in the art will also appreciate that the second receiving module 901, the second obtaining module 903, the second transmitting module 905 and the second filtering module 908 described above may refer to a combination of analog and digital circuits, and/or one or more processors configured with software and/or firmware, e.g. stored in a memory, that when executed by the one or more processors such as the second processor 904 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a second computer program may comprise instructions which, when executed on at least one processor (e.g. the second processor 904), cause the at least one processor to carry out the method steps 801-803. A second carrier (e.g. the second memory 910) may comprise the second computer program, and the carrier is one of an electronic signal, optical signal, radio signal or computer readable storage medium.

Figure 10:
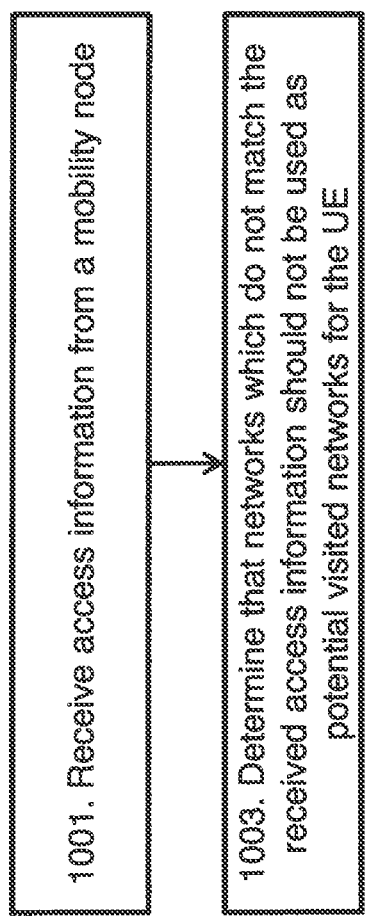
FIG. 10 is a flow chart illustrating embodiments of a method performed by a RAN node or a wireless access node

The method described above will now be described seen from the perspective of the RAN node 103. FIG. 10 is a flowchart describing the present method in the RAN node 103 for handling a UEs 101 access to networks. The RAN node 103 is located in a visited network 100*v* which is currently accessed by a UE 101. The RAN node 103 may be an eNB or a BSC or an RNC or a NB or a TWAG or an ePDG. The method in FIG. 10 comprises at least some of the following steps to be performed by the RAN node 103:

Step 1001

This step corresponds to step 305 in FIG. 3. The RAN node 103 receives access information from a mobility node 105. The access information comprises allowed network IDs and corresponding allowed RAT for the current visited network 100*v* and at least one potential visited network which the UE 101 is allowed to access.

Step 1002

This step corresponds to step 307 in FIG. 3. Based on the received access information, the RAN node 103 determines that networks which do not match the received access information should not be used as potential visited networks for the UE 101.

The networks which should not be used as potential visited networks for the UE 101 may be at least one of: excluded from cell measurements, excluded as handover target, and excluded redirection target.

Figure 11:
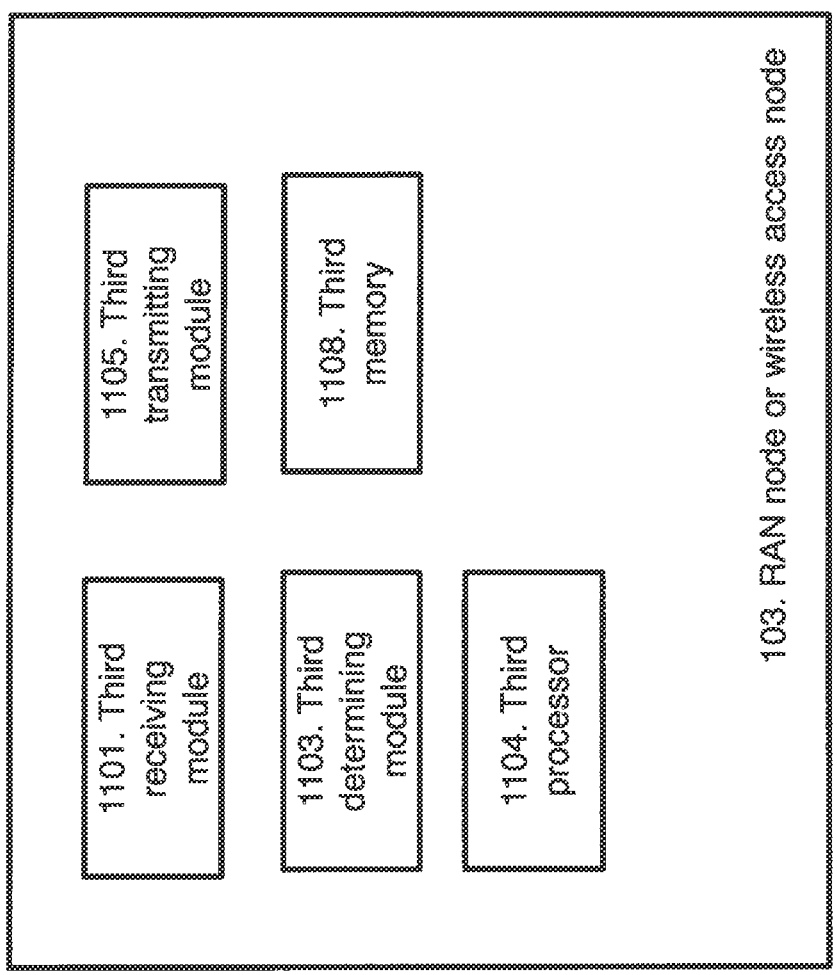
FIG. 11 is a schematic block diagram illustrating embodiments of a RAN node or a wireless access node.

To perform the method steps shown in FIG. 10 for handling a UEs 101 access to networks the RAN node 103 may comprise an arrangement as shown in FIG. 11. The RAN node 103 is arranged to be located in a visited network 100*v* which is currently accessed by a UE 101.

The RAN node 103 is further arranged to, e.g. by means of a third receiving module 1101, receive access information from a mobility node 105. The access information comprises allowed network IDs and corresponding allowed RAT for the current visited network 100*v* and at least one potential visited network which the UE 101 is allowed to access. The third receiving module 1101 may also be referred to as a third receiving unit, a third receiving means, a third receiving circuit, third means for receiving, third input unit. The third receiving module 1101 may be a receiver, a transceiver etc. The third receiving module 1101 may be a wireless receiver of the RAN node 103 of a wireless or fixed communications system.

The RAN node 103 is arranged to, e.g. by means of a third determining module 1103, based on the received access information, determine that networks which do not match the received access information should not be used as potential visited networks for the UE 101. The third determining module 1103 may also be referred to as a third determining unit, a third determining means, a third determining circuit, third means for determining. The third determining module 1103 may be a third processor 1104 of the RAN node 103.

The networks which should not be used as potential visited networks for the UE 101 may be at least one of: excluded from cell measurements, excluded as handover target, and excluded redirection target.

The RAN node 103 may be a wireless access node, an eNB or a BSC or an RNC or a NB or a TWAG or an ePDG.

The RAN node 103 may further comprise a third transmitting module 1105 which is arranged to transmit information to other nodes in the communication system 100. The third transmitting module 1105 may also be referred to as a third transmitting unit, a third transmitting means, a third transmitting circuit, third means for transmitting, third output unit. The third transmitting module 1105 may be a transmitter, a transceiver etc. The third transmitting module 1105 may be a wireless transmitter of the RAN node 103 of a wireless or fixed communications system.

The RAN node 103 may further comprise a memory 1108 comprising one or more memory units. The memory 1108 is arranged to be used to store data, received data streams, power level measurements, access information, RAT information, PLMN information, network information, request messages, response messages, network IDs, threshold values, time periods, configurations, schedulings, and applications to perform the methods herein when being executed in the RAN node 103.

Those skilled in the art will also appreciate that the third receiving module 1101, the third determining module 1103 and the third transmitting module 1105 described above may refer to a combination of analog and digital circuits, and/or one or more processors configured with software and/or firmware, e.g. stored in a memory, that when executed by the one or more processors such as the third processor 1104 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a third computer program may comprise instructions which, when executed on at least one processor (e.g. the third processor 1104), cause the at least one processor to carry out the method steps 1001-1003. A third carrier (e.g. the third memory 1108) may comprise the third computer program, and the third carrier is one of an electronic signal, optical signal, radio signal or computer readable storage medium.

The present mechanism for handling a UEs 101 access to networks may be implemented through one or more processors, such as a processor xx in the mobility node arrangement depicted in FIG. 7, a processor xxx in the subscriber server arrangement depicted in FIG. 9 and a processor xx in the RAN node arrangement depicted in FIG. 10, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the mobility node 105, the subscriber server 108 and the RAN node 103. One such carrier may be in the form of a CD ROM disc. It is however feasible with other data carriers such as a memory stick. The computer program code can furthermore be provided as pure program code on a server and downloaded to at least one of the mobility node 105, the subscriber server 108 and the RAN node 103.

A "Restriction of subscribers' access" functionality has previously been enhanced to allow the restriction to access the E-UTRAN RAT depending on the PLMN where the UE is camping. The use case which was the basis for the enhancement was that a user may have access to E-UTRAN in his/her home network, but may have no access to that RAT while roaming, to avoid unexpected potentially high roaming fees.

Furthermore, the behaviour of the HSS has previously been changed when the HSS receives an Update Location Request command from the MME/SGSN. In this case, the HSS must take into account the PLMN of the MME/SGSN, in addition to the RAT used by the UE, in order to authorize or reject the Update Location Request.

It has previously not been specified whether the HSS must be capable of defining for each user a different access restriction per-PLMN or if, on the other hand, it is enough to define an access restriction applicable to the HPLMN and another restriction set applicable to the roaming case. The subscription data stored in the HSS should enable HSS to send different subscription data related to RAT restriction based on the PLMN UE camped.

It should be noted that defining access restriction for a given user with a per-PLMN granularity, as opposed to defining just home/roaming access restrictions, has the advantage of, e.g., allowing E-UTRAN access in a VPLMN1, which may be a partner of the user's HPLMN, while disallowing E-UTRAN access in VPLMN2, which may not have any particular relationship with HPLMN.

In the scenario described above, it is clear that a serving node (e.g. a MME/SGSN) only has information regarding the RAT access restrictions for a given user in the current PLMN where the MME/SGSN is located. It does not have knowledge of the access restrictions applicable in other PLMNs. This results in limitations on the inter-PLMN handover procedures, such as:

At inter-RAT handover, an UE currently served by SGSN1 in PLMN1, with E-UTRAN not allowed in PLMN1, may attempt an access change towards an MME2 in PLMN2, where E-UTRAN might be allowed for that UE. This access change should be allowed but, given that the SGSN1 only has knowledge of E-UTRAN not being allowed for the UE, the access change may not work correctly. As an example, the UE will not attempt to perform a cell change to a cell with a different PLMN ID unless the MME/SGSN/MSC has provided the UE with a NAS Equivalent PLMNs List which includes these PLMN IDs.

At intra-RAT handover, an UE currently served by MME1 in PLMN1, with E-UTRAN allowed in PLMN1, may attempt a handover towards MME2 in PLMN2, where E-UTRAN might not be allowed for that UE. This handover should be prevented, but given that the MME1 only has knowledge of E-UTRAN being allowed for the UE, the procedure may proceed, suboptimally, until MME2 gets the Update Location Request rejected by HSS, when it could have been stopped earlier at MME1, with significant signaling savings.

In order to overcome those limitations, the HSS needs to communicate to the serving node the access restrictions of the UE in other PLMNs than the current PLMN of the serving node.

One alternative embodiment may be that the HSS sends to the serving node, as part of the subscription data returned in Update Location Answer, the access restrictions for all possible PLMNs. The implementation of this embodiment may be optimized, by sending in a single Information Element, those access restrictions generic to all PLMNs not explicitly indicated otherwise; and then sending pairs of {PLMN-ID, Access Restriction} when those restrictions differ from the generic one.

Another alternative embodiment may be that the HSS informs the serving node about the access restrictions in a small amount of PLMNs, indicated by the serving node itself, corresponding to only those adjacent, or overlapping, PLMNs to the current PLMN, where it is realistic to think that an access change is likely to occur. Therefore, the serving node may include in the Update Location Request command a number of adjacent PLMN-IDs for which it requests access restriction data from the HSS, and the HSS will send as part of subscription data only the requested data. This results in a very small data set, with an increase of message size almost negligible.

Summarized, the mobility node needs to be aware of the RAT access restrictions in other PLMNs than their own PLMN, in order to allow/prevent inter-RAT inter-PLMN handovers towards those neighbor PLMNs, where the access restrictions may be different for a given UE 101.

The embodiments herein add a parameter to the Update Location Request message sent by mobility node 105 including the list of adjacent PLMNs to the PLMN where the mobility node 105 is located. Furthermore, the embodiments herein add a subscription parameter sent by the subscriber server 108 in the Update Location Answer message, or in IDR, indicating the list of RAT access restrictions for those PLMNs previously indicated by the mobility node 105 as adjacent PLMNs.

Without the embodiments herein, in inter-RAT inter-PLMN handover scenarios, the mobility node 105 may not behave correctly when it has to allow, or prevent, the handover procedure, if the mobility node 105 is not aware of the access restrictions to be applied to the UE in the target PLMN.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a mobility node for handling a user equipment's (UE's) access to networks, wherein the mobility node is located in a visiting network which is currently accessed by the UE, the method comprising:
   when the UE accesses the current visited network, transmitting, through the visited network to a subscriber server in a home network of the UE a request for access information for the UE, wherein the request for access information comprises network information which indicates the current visited network and at least one potential visited network which the UE can access;
   receiving, from the subscriber server, access information for at least some of the networks indicated in the request, wherein the access information comprises allowed network IDs and corresponding allowed RATs for at least some of the networks indicated in the request which the UE is allowed to access; and
   when the UE accesses or attempts to access one of the potential visited networks, determining, based on the previously received access information, if the UE is allowed to access the potential visited network.

2. The method of claim 1, wherein determining, based on the previously received access information, if the UE is allowed to access the potential visited network further comprises:
   determining, based on the previously received access information, if the UE is allowed to access a RAT of the potential visited network.

3. The method of claim 1, wherein the determining, based on the previous received access information, if the UE is allowed to access the potential visited network further comprises at least one of:
   comparing a network ID of the potential visited network with the allowed network IDs in the received access information; and
   comparing the RAT of the potential visited network with the allowed RATs in the received access information.

4. The method of claim 1, wherein each allowed network ID has at least one corresponding allowed RAT, and
   wherein each allowed network ID and its corresponding allowed RAT are organized in a pair.

5. The method of claim 1, wherein the UE is allowed to access the potential visited network when the network ID of the potential visited network matches an allowed network ID in received access information and when the RAT of the potential visited network matches an allowed RAT in the received access information, wherein the allowed network ID and the allowed RAT are associated with each other.

6. The method of claim 1, wherein the UE is not allowed to access the potential visited network when at least one of:
   the network ID of the potential visited network does not match the allowed network ID, and
   the RAT of the potential visited network does not match the allowed RAT.

7. The method of claim 1, further comprising:
   transmitting the received access information to a RAN node or a wireless access node.

8. The method of claim 1, wherein the request for access information is a dedicated message for the request for access information; or wherein the request for access information is sent in a Update Location Request message.

9. The method of claim 1, wherein the access information is received in a dedicated message for the access information; or wherein the access information is received in a Update Location Answer message.

10. The method of claim 1, wherein the current visited network is a current visited PLMN and the potential visited network is a potential visited PLMN.

11. The method of claim 1, wherein the current visited network comprises one or more RAT and the potential visited network comprises one or more RAT.

12. The method of claim 1, wherein the RAT is a 3GPP RAN or a non-3GPP RAN.

13. The method of claim 1, wherein the network ID of the potential visited network is a PLMN ID or a SSID and the allowed network ID is an allowed PLMN ID or an allowed SSID.

14. The method of claim 1, wherein the mobility node is an MME or an SGSN or a combined MME and SGSN or a TWAG or an ePDG.

15. A computer program product comprising a non-transitory computer readable medium storing a computer program comprising instructions which, when executed on at least one processor, cause the at least one processor to carry out the method of claim 1.

16. A method performed by a subscriber server for handling a user equipment's (UE's) access to networks, wherein the subscriber server is located in a home network of the UE, the method comprising:
when the UE accesses a current a visited network, receiving, from a mobility node in the visited network, a request for access information for the UE, wherein the request comprises network information which indicates the current visited network and at least one potential visited network which the UE can access;
obtaining the requested access information, wherein the access information comprises allowed network IDs and corresponding allowed restricted RATs for at least some of the networks indicated in the request which the UE is allowed to access; and
transmitting the requested restriction information to the mobility node.

17. The method of claim 16, wherein the allowed network IDs and corresponding allowed restricted RAT are organized in pairs in the subscriber server.

18. The method of claim 16, wherein the obtaining the access information further comprises:
filtering the requested access information indicated in the request from all access information comprised in the subscriber server.

19. The method of claim 18, wherein the amount of transmitted access information is smaller than the amount of all access information comprised in the subscriber server.

20. The method of claim 16, wherein the potential visited network which the UE access is at least one of an adjacent network which is adjacent to the current visited network and an overlapping network which overlaps with the current visited network.

21. The method of claim 16, wherein the requested access information is transmitted as part of subscription data to the mobility node.

22. The method of claim 16, wherein the subscriber server is an HSS or an HLR or an AAA server.

23. A computer program product comprising a non-transitory computer readable medium storing a computer program comprising instructions which, when executed on at least one processor, cause the at least one processor to carry out the method of claim 16.

24. A method performed by a RAN node for handling a user equipment's (UE's) access to networks, wherein the RAN node is located in a visited network which is currently accessed by a UE having a home network, the method comprising:
receiving access information from a mobility node residing in the visited network, wherein the access information comprises subscription information that the mobility node residing in the visited network obtained from a subscriber server residing in the UE's home network, wherein the subscription information obtained from the subscriber server in the UE's home network comprises: i) a network ID identifying a potential visited network and ii) radio access technology (RAT) information associated with the network ID and identifying one or more allowed RATs for the potential visited network identified by the network ID; and
based on the received access information, determining that networks which do not match the received access information should not be used as potential visited networks for the UE.

25. The method of claim 24, wherein the networks which should not be used as potential visited networks for the UE should be at least one of: excluded from cell measurements, excluded as handover target, and excluded redirection target.

26. The method of claim 24, wherein the RAN node is an eNB or a BSC or an RNC or a NB or a TWAG or an ePDG.

27. A computer program product comprising a non-transitory computer readable medium storing a computer program comprising instructions which, when executed on at least one processor, cause the at least one processor to carry out the method of claim 24.

28. A mobility node arranged to handle a user equipment's (UE's) access to networks, wherein the mobility node is arranged to be located in a visiting network which is currently accessed by the UE, the mobility node is further arranged to:
when the UE accesses the current visited network, transmit, through the visited network to a subscriber server in a home network of the UE, a request for access information for the UE, wherein the request comprises network information which indicates the current visited network and at least one potential visited network which the UE can access;
receive, from the subscriber server, the requested access information for at least some of the networks indicated in the request, wherein the access information comprises allowed network IDs and corresponding allowed RATs for at least some of the networks indicated in the request which the UE is allowed to access; and
when the UE should access one of the potential visited networks, determine, based on the previously received access information, if the UE is allowed to access the potential visited network.

29. The mobility node of claim 28, wherein the mobility node is further arranged to:
determine, based on the previously received access information, if the UE is allowed to access a RAT of the potential visited network.

30. The mobility node of claim 28, wherein the mobility node is further arranged to:
compare a network ID of the potential visited network with the allowed network IDs in the received access information; and to compare the RAT of the potential visited network with the allowed RATs in the received access information.

31. The mobility node of claim 28, wherein
each allowed network ID has at least one corresponding allowed RAT, and
each allowed network ID and its corresponding allowed RAT are organized in a pair.

32. The mobility node of claim 28, wherein the UE is arranged to be allowed to access the potential visited network when the network ID of the potential visited network matches an allowed network ID in received access information and when the RAT of the potential visited network matches an allowed RAT in the received access information, wherein the allowed network ID and the allowed RAT are associated with each other.

33. The mobility node of claim 28, wherein the UE is arranged to be not allowed to access the potential visited network when at least one of:
the network ID of the potential visited network does not match the allowed network ID, and
the RAT of the potential visited network does not match the allowed RAT.

34. The mobility node of claim 28, wherein the mobility node is further arranged to:
transmit the received access information to a RAN node or a wireless access node.

35. The mobility node of claim 28, wherein the request for access information is a dedicated message for the request for access information; or wherein the request for access information is sent in a Update Location Request message.

36. The mobility node of claim 28, wherein the access information is arranged to be received in a dedicated message for the access information; or wherein the access information is arranged to be received in a Update Location Answer message.

37. The mobility node of claim 28, wherein the current visited network is a current visited PLMN and the potential visited network is a potential visited PLMN.

38. The mobility node of claim 28, wherein the current visited network comprises one or more RAT and the potential visited network comprises one or more RAT.

39. The mobility node of claim 28, wherein the RAT is a 3GPP RAN or a non-3GPP RAN.

40. The mobility node of claim 28, wherein the network ID of the potential visited network is a PLMN ID or a SSID and the allowed network ID is an allowed PLMN ID or an allowed SSID.

41. The mobility node of claim 28, wherein the mobility node is an MME or an SGSN or a combined MME and SGSN or a TWAG or an ePDG.

42. A subscriber server arranged to handle a user equipment's (UE's) access to networks, wherein the subscriber server is arranged to be located in a home network of a UE, the subscriber server is further arranged to:
when the UE accesses a current a visited network, receive, from a mobility node in the visited network, a request for access information for the UE, wherein the request comprises network information which indicates the current visited network and at least one potential visited network which the UE can access;
obtain the requested access information, wherein the access information comprises allowed network IDs and corresponding allowed restricted RATs for at least some of the networks indicated in the request which the UE is allowed to access; and to
transmit the requested restriction information to the mobility node.

43. The subscriber server of claim 42, wherein the allowed network IDs and corresponding allowed restricted RAT are arranged to be organized in pairs in the subscriber server.

44. The subscriber server of claim 42, wherein the subscriber server is further arranged to:
filter the requested access information indicated in the request from all access information comprised in the subscriber server.

45. The subscriber server of claim 44, wherein the amount of transmitted access information is smaller than the amount of all access information comprised in the subscriber server.

46. The subscriber server of claim 42, wherein the potential visited network which the UE access is at least one of an adjacent network which is adjacent to the current visited network and an overlapping network which overlaps with the current visited network.

47. The subscriber server of claim 42, wherein the requested access information is arranged to be transmitted as part of subscription data to the mobility node.

48. The subscriber server of claim 42, wherein the subscriber server is an HSS or an HLR or an AAA server.

49. A RAN node arranged to handle a user equipment's (UE's) access to networks, wherein the RAN node is arranged to be located in a visited network which is currently accessed by a UE, the RAN node is further arranged to:
obtain access information from a mobility node residing in the visited network, wherein the access information comprises subscription information that the mobility node residing in the visited network obtained from a subscriber server residing in the UE's home network, wherein the subscription information obtained from the subscriber server in the UE's home network comprises:
i) a network ID identifying a potential visited network and ii) radio access technology (RAT) information associated with the network ID and identifying one or more allowed RATs for the potential visited network identified by the network ID; and
based on the received access information, determine that networks which do not match the received access information should not be used as potential visited networks for the UE.

50. The RAN node of claim 49, wherein the networks which should not be used as potential visited networks for the UE should be at least one of: excluded from cell measurements, excluded as handover target, and excluded redirection target.

51. The RAN node of claim 49, wherein the RAN node is a wireless access node, an eNB or a BSC or an RNC or a NB or a TWAG or an ePDG.

52. A method for handling a user equipment's (UE's) access to networks, wherein the mobility node is arranged to be located in a visiting network which is currently accessed by the UE, wherein the communication system comprises the UE, a mobility node, a subscriber server and a RAN node, the method comprising:
when the UE accesses the current visited network, transmitting, from the mobility node through the visited network to a subscriber server in a home network of the UE, a request for access information for the UE, wherein the request comprises network information which indicates the current visited network and at least one potential visited network which the UE can access;
receiving, at the mobility node and from the subscriber server, the requested access information for at least some of the networks indicated in the request, wherein the access information comprises allowed network IDs and corresponding allowed RATs for at least some of the networks indicated in the request which the UE is allowed to access; and when the UE should access one of the potential visited networks, determining, at the mobility node and based on the previously received access information, if the UE is allowed to access the potential visited network;

when the UE accesses a current a visited network, receiving, at the subscriber server from a mobility node in the visited network, a request for access information for the UE, wherein the request comprises network information which indicates the current visited network and at least one potential visited network which the UE can access;

obtaining, at the subscriber server, the requested access information, wherein the access information comprises allowed network IDs and corresponding allowed restricted RATs for at least some of the networks indicated in the request which the UE is allowed to access; and transmitting, from the subscriber server, the requested restriction information to the mobility node;

receiving, at the RAN node, access information from a mobility node, wherein the access information comprises allowed network IDs and corresponding allowed RAT for the current visited network and at least one potential visited network which the UE is allowed to access; and based on the received access information, determining, at the RAN node, that networks which do not match the received access information should not be used as potential visited networks for the UE.

53. A communication system arranged to handling a user equipment's (UE's) access to networks, wherein the mobility node is arranged to be located in a visiting network which is currently accessed by the UE, wherein the communication system comprises the UE, a mobility node, a subscriber server and a RAN node, wherein the mobility node is arranged to:

when the UE accesses the current visited network, transmit, through the visited network to a subscriber server in a home network of the UE, a request for access information for the UE, wherein the request comprises network information which indicates the current visited network and at least one potential visited network which the UE can access;

receive, from the subscriber server, the requested access information for at least some of the networks indicated in the request, wherein the access information comprises allowed network IDs and corresponding allowed RATs for at least some of the networks indicated in the request which the UE is allowed to access; and to when the UE should access one of the potential visited networks, determine, based on the previously received access information, if the UE is allowed to access the potential visited network, wherein the subscriber server is arranged to:

when the UE accesses a current a visited network, receive, from a mobility node in the visited network, a request for access information for the UE, wherein the request comprises network information which indicates the current visited network and at least one potential visited network which the UE can access;

obtain the requested access information, wherein the access information comprises allowed network IDs and corresponding allowed restricted RATs for at least some of the networks indicated in the request which the UE is allowed to access; and to transmit the requested restriction information to the mobility node, and wherein the RAN node is arranged to:

receive access information from a mobility node, wherein the access information comprises allowed network IDs and corresponding allowed RAT for the current visited network and at least one potential visited network which the UE is allowed to access; and to based on the received access information, determine that networks which do not match the received access information should not be used as potential visited networks for the UE.

* * * * *

UNITED STATES PATENT AND TRADEMARK OFFICE
CERTIFICATE OF CORRECTION

| | | |
|---|---|---|
| PATENT NO. | : 9,949,174 B2 | Page 1 of 3 |
| APPLICATION NO. | : 15/034313 | |
| DATED | : April 17, 2018 | |
| INVENTOR(S) | : Olsson et al. | |

It is certified that error appears in the above-identified patent and that said Letters Patent is hereby corrected as shown below:

On the Title Page

In Item (56), under "OTHER PUBLICATIONS", in Column 2, Line 1, delete "Subscripton" and insert -- Subscription --, therefor.

In Item (57), under "ABSTRACT", in Column 2, Line 2, delete "handling handling" and insert -- handling --, therefor.

On Page 2, in Item (56), under "OTHER PUBLICATIONS", in Column 2, Line 7, delete "Ericcson," and insert -- Ericsson, --, therefor.

In the Drawings

In Fig. 5, Sheet 5 of 11, for Tag "501", in Line 1, delete "(Adjacent-PLMN = PLMN2)" and insert -- (Adjacent-PLMN = PLMN_2) --, therefor.

In the Specification

In Column 1, Line 20, delete "to handling" and insert -- to handle --, therefor.

In Column 3, Line 17, delete "current a" and insert -- current --, therefor.

In Column 3, Line 42, delete "to handling" and insert -- to handle --, therefor.

In Column 3, Line 65, delete "current a" and insert -- current --, therefor.

In Column 8, Line 2, delete "MMES" and insert -- MMEs --, therefor.

In Column 8, Line 7, delete "UE's 101" and insert -- UEs 101 --, therefor.

Signed and Sealed this
Seventeenth Day of July, 2018

Andrei Iancu
*Director of the United States Patent and Trademark Office*

In Column 8, Line 45, delete "UE 105" and insert -- UE 101 --, therefor.

In Column 8, Line 63, delete "MME 208 and the 225." and insert -- MME 205 and the HSS 225. --, therefor.

In Column 10, in Table 2, under "Network ID", Line 11, delete "V-PLMN 6" and insert -- V-PLMN_6 --, therefor.

In Column 11, Line 34, delete "mobility node 108" and insert -- mobility node 105 --, therefor.

In Column 11, Line 35, delete "UE 101." and insert -- UE 101). --, therefor.

In Column 11, Line 54, delete "mobility node 108" and insert -- mobility node 105 --, therefor.

In Column 11, Line 56, delete "mobility node 108" and insert -- mobility node 105 --, therefor.

In Column 11, Line 58, delete "mobility node 108" and insert -- mobility node 105 --, therefor.

In Column 14, Line 21, delete "PLMN-ID's" and insert -- PLMN-IDs --, therefor.

In Column 14, Line 27, delete "SGSN/MME 205, 208" and insert -- SGSN/MME 208, 205 --, therefor.

In Column 14, Line 29, delete "SGSN/MME 205, 208" and insert -- SGSN/MME 208, 205 --, therefor.

In Column 14, Lines 31-32, delete "SGSN/MME 205, 208" and insert -- SGSN/MME 208, 205 --, therefor.

In Column 14, Lines 33-34, delete "SGSN/MME 205, 208." and insert -- SGSN/MME 208, 205. --, therefor.

In Column 14, Line 35, delete "SGSN/MME 205, 208" and insert -- SGSN/MME 208, 205 --, therefor.

In Column 18, Line 28, delete "current a" and insert -- current --, therefor.

In Column 19, Line 6, delete "current a" and insert -- current --, therefor.

In the Claims

In Column 25, Line 31, in Claim 16, delete "current a" and insert -- current --, therefor.

In Column 27, Line 55, in Claim 42, delete "current a" and insert -- current --, therefor.

In Column 29, Line 8, in Claim 52, delete "current a" and insert -- current --, therefor.

CERTIFICATE OF CORRECTION (continued)
U.S. Pat. No. 9,949,174 B2

In Column 29, Line 33, in Claim 53, delete "to handling" and insert -- to handle --, therefor.

In Column 30, Line 17, in Claim 53, delete "current a" and insert -- current --, therefor.